US012485311B2

(12) United States Patent
Sinton et al.

(10) Patent No.: US 12,485,311 B2
(45) Date of Patent: Dec. 2, 2025

(54) SYSTEM AND METHOD FOR USING WEATHER APPLIED METRICS FOR PREDICTING THE FLIGHT OF A FOOTBALL

(71) Applicant: Weather Applied Metrics, Inc., Santa Cruz, CA (US)

(72) Inventors: Douglas Milton Sinton, Palo Alto, CA (US); John Amirault Farley, Lexington, SC (US); Kenneth Martin Arneson, Alameda, CA (US)

(73) Assignee: Weather Applied Metrics, Inc., Santa Cruz, CA (US)

( * ) Notice: Subject to any disclaimer, the term of this patent is extended or adjusted under 35 U.S.C. 154(b) by 288 days.

(21) Appl. No.: 18/085,347

(22) Filed: Dec. 20, 2022

(65) Prior Publication Data
US 2023/0191193 A1 Jun. 22, 2023

Related U.S. Application Data

(60) Provisional application No. 63/291,781, filed on Dec. 20, 2021.

(51) Int. Cl.
A63B 24/00 (2006.01)

(52) U.S. Cl.
CPC .. *A63B 24/0021* (2013.01); *A63B 2024/0034* (2013.01); *A63B 2220/72* (2013.01); *A63B 2220/74* (2013.01); *A63B 2220/75* (2013.01); *A63B 2220/76* (2013.01)

(58) Field of Classification Search
CPC ............ A63B 2220/76; A63B 2220/75; A63B 2220/74; A63B 2220/72; A63B 2024/0034
See application file for complete search history.

(56) References Cited

U.S. PATENT DOCUMENTS

| 5,558,333 A | 9/1996 | Kelson et al. |
| 2002/0143729 A1 | 10/2002 | Fostick |
| 2005/0233815 A1 | 10/2005 | McCreary et al. |
| 2007/0167247 A1 | 7/2007 | Lindsay |
| 2013/0184089 A1 | 7/2013 | Raucholz et al. |
| 2013/0314694 A1 | 11/2013 | Tchoryk, Jr. et al. |

(Continued)

OTHER PUBLICATIONS

Sawicki et al., "How to Hit Home Runs: Optimum Baseball Bat Swing Parameters for Maximum Range Trajectories", American Association of Physics Teachers, http://baseball.physics.illinois.edu/AJP-Nov03.pdf, Jun. 12, 2002, 11 pages.

(Continued)

*Primary Examiner* — Reginald A Renwick
(74) *Attorney, Agent, or Firm* — Beyer Law Group LLP

(57) ABSTRACT

A system and method for using weather applied metrics for determining the impact of weather conditions on the flight of a football at an outside football venue. Historical and current data for weather parameters, including wind, air pressure, humidity, temperature, and rain, are obtained to calculate the influence of each parameter on the flight of a football. Weather instruments, such as weather sensors, anemometers, LiDAR and SODAR devices, weather consoles, data routing devices, and processors can be included in a system for using weather applied metrics to predict the flight of a football based on current weather conditions.

19 Claims, 22 Drawing Sheets

(56) References Cited

U.S. PATENT DOCUMENTS

| | | |
|---|---|---|
| 2014/0327569 A1 | 11/2014 | Fun et al. |
| 2017/0323236 A1 | 11/2017 | Quintavalla et al. |
| 2017/0371074 A1 | 12/2017 | Elkabetz et al. |
| 2018/0117400 A1 | 5/2018 | Martin et al. |
| 2018/0229080 A1* | 8/2018 | Martin .................. G01S 13/865 |
| 2020/0018666 A1 | 1/2020 | Tang et al. |
| 2021/0182461 A1* | 6/2021 | Martin .................... G01W 1/02 |

OTHER PUBLICATIONS

Kensrud, "Determining Aerodynamic Properties of Sports Balls in Situ", Washington State University, Department of Mechanical and Materials Engineering, http://baseball.physics.illinois.edu/KensrudThesis.pdf, Aug. 2010, 127 pages.

Robinson et al., "The Motion of an Arbitrarily Rotating Spherical Projectile and its Application to Ball Games", The Royal Swedish Academy of Sciences, vol. 88, No. 1, https://iopscience.iop.org/article/10.1088/0031-8949/88/01/018101;jsessionid=47C332E19E87E378510AA986E6E74A8D.c3.iopscience.cld.iop.org, Jul. 4, 2013, 4 pages.

National Aeronautics and Space Administration, "Lift of a Baseball", https://www.grc.nasa.gov/www/k-12/airplane/balllift.html, May 2007, 2 pages.

Nathan, "The Effect of Spin on the Flight of a Baseball", Department of Physics, University of Illinois, Urbana, Illinois 61801, http://baseball.physics.illinois.edu/AJPFeb08.pdf, Jun. 27, 2007, 6 pages.

Clanet, "Sports Ballistics", Annual Review of Fluid Mechanics, http://baseball.physics.illinois.edu/clanet/ClanetSportsBallistics.pdf, Sep. 22, 2014, 26 pages.

Nathan, "Going Deep on Goin' Deep", The Hardball Times, https://tht.fangraphs.com/going-deep-on-goin-deep/, Apr. 6, 2016, 10 pages.

Russell, "Forces Between Bat and Ball", Graduate Program in Acoustics, Pennsylvania State University, https://www.acs.psu.edu/drussell/bats/impulse.htm, 2001-2011, 2 pages.

Werner, "Flight Model of a Golf Ball", http://www.users.csbsju.edu/~jcrumley/222_2007/projects/awwerner/project.pdf, Mar. 2007, 13 pages.

"Relationship Between Density, Pressure, and Temperature", http://msrc.sunysb.edu/~chang/atm205/Notes/Chapter_1_txtb.pdf, downloaded from the internet on Jan. 24, 2019, 7 pages.

Hample, "1,000-foot Baseball Catch", https://mlblogssnaggingbaseballs.wordpress.com/2012/06/15/1000-foot-baseball-catch/, Jun. 15, 2012, 7 pages.

Kothmann, "Aerodynamics of Sports Balls", Annual Review of Fluid Mechanics, https://www.seas.upenn.edu/~meam211/slides/aero.pdf, Jan. 2007, 13 pages.

Alam et al., "A Study of Baseball and Softball Aerodynamics", SciVerse ScienceDirect, Procedia Engineering 34 (20120 86-91, https://ac.els-cdn.com/S1877705812016293/1-s2.0-S1877705812016293-main.pdf?_tid=f0325ef2-6a06-4cd7-b872-a3eb612c683a&acdnat=1548790839_859bf532733e01ae3cf4901e7754e515, Mar. 2, 2012, pp. 86-91.

Adair, "The Physics of Baseball", Physics Today, https://www.freewebs.com/anskyboy2/Physics%20of%20Baseball%20(Adair).pdf, May 26, 1995, 6 pages.

Fitzpatrick, "Air Drag", http://farside.ph.utexas.edu/teaching/329/lectures/node42.html, Mar. 29, 2006, 5 pages.

Kagan et al., "Simplified Models for the Drag Coefficient of a Pitched Baseball", The Physics Teacher, vol. 52, http://baseball.physics.illinois.edu/DragTPTMay2014.pdf, May 2014, 3 pages.

"Life's a Drag Crisis", https://thatsmaths.com/2015/11/26/lifes-a-drag-crisis/, Nov. 26, 2015, 3 pages.

Frohlich, "Aerodynamic Drag Crisis and its Possible Effect on the Flight of Baseballs", American Association of Physics Teachers, Am. J. Phys., vol. 52, No. 4, Institute for Geophysics, University of Texas at Austin, http://ww2.odu.edu/~agodunov/teaching/phys420/files/Frohlich.pdf, Apr. 1984, 10 pages.

Mehta, "Aerodynamics of Sports Balls", Ann. Rev. Fluid Mech., https://people.stfx.ca/smackenz/courses/HK474/Labs/Jump%20Float%20Lab/Mehta%201985%20Aerodynamics%20of%20sports%20balls.pdf, 1985, 17:151-89, 40 pages.

De Mestre, "The Mathematics of Projectiles in Sports", School of Information and Computing Sciences, Bond University, Queensland, Australia, https://books.google.com/books?hl=en&lr=&id=xVXDjDVuhN4C&oi=fnd&pg=PP11&dq=info:Xs9qGjRzr-kJ:scholar.google.com/&ots=BMIahrKOGJ&sig=Uj09twmh9RcH_8Y_014k-DD2pbY#v=onepage&q&f=false, 1990.

Brancazio, "The Physics of Kicking a Football", The Physics Teacher, http://citeseerx.ist.psu.edu/viewdoc/download?doi=10.1.1.694.2525&rep=rep1&type=pdf, Oct. 1995, 5 pages.

Horn et al., "On the Flight of the American Football", Physics Department, California State University Fullerton, https://physics.fullerton.edu/~heidi/PROJECTS/football.pdf, Jun. 4, 2007, 22 pages.

Penner, "The Physics of Golf", Institute of Physics Publishing, Reports on Progress in Physics 66 (2003) pp. 131-171, http://raypenner.com/golf-physics.pdf, Dec. 20, 2002.

Trackman, "Normalization Feature Explained", Jul. 9, 2014, https://web.archive.org/web/20140808093226/https://blog.trackmangolf/normalization-feature-explained, 9 pages.

Kemp, "Weather: A Major Factor", Aug. 2007, https://web.archive.org/web/20150831004156/https://www.golfdigest.com/story/gw070803pgaweather, 6 pages.

Alaways, "Aerodynamics of the Curve-Ball: An Investigation of the Effects of Angular Velocity on Baseball Trajectories", Jan. 1998 Dissertation, https://www.researchgate.net/publication/241376252_Aerodynamics_of_the_curveball_An_investigation_of_the_effects_of_angular_velocity_on_baseball_trajectories, 151 pages.

Jalilian et al., "Computational Aerodynamics of Baseball, Soccer Ball and Volleyball", American Journal of Sports Science, vol. 2, No. 5, pp. 115-121, doi: 10.11648/j.ajss.20140205.12, Sep. 20, 2014.

Kensrud et al., "Relating Baseball Seam Height to Carry Distance", Washington State University, Department of Mechanical and Materials Engineering, Procedia Engineering 112 (2015) pp. 406-411.

Robinson et al., "The Motion of an Arbitrarily Rotating Spherical Projectile and its Application to Ball Games", The Royal Swedish Academy of Sciences, vol. 88, No. 1, https://iopscience.iop.org/article/10.1088/0031-8949/88/01/018101;jsessionid=47C332E19E87E378510AA986E6E74A8D.c3.iopscience.cld.iop.org, Jul. 4, 2013, 18 pages.

De Mestre, "The Mathematics of Projectiles in Sport", School of Information and Computing Sciences, Bond University, Queensland, Australia, 1990, 38 relevant pages in total.

* cited by examiner

FIG. 8

SYSTEM AND METHOD FOR USING WEATHER APPLIED METRICS FOR PREDICTING THE FLIGHT OF A FOOTBALL

RELATED APPLICATION

This application claims the benefit of U.S. Provisional Patent Application No. 63/291,781, filed on Dec. 20, 2021, which is hereby incorporated by reference in its entirety for all purposes.

BACKGROUND

The present invention relates generally to weather factors in sports. More particularly, the present invention relates to a system and method for predicting the flight of a football based on weather conditions at a particular location.

Weather has a significant impact on many sports, such as baseball, football, golf, etc. There is a significant amount of credible research that explains how weather impacts the balls used in all major sports in outdoor venues. Given the knowledge that weather can impact the flight of a ball, it would be desirable to have a system for predicting the flight of a ball in sports at a given location and for determining the impact of weather parameters based on the current and future weather conditions.

SUMMARY OF THE INVENTION

In accordance with an embodiment, computer-implemented method is provided for determining an impact of weather parameters on a flight of a football at an outdoor football venue. A digital model of the outdoor football venue is provided to a processor. At the processor, data for at least one weather parameter at or near the outdoor football venue is obtained. The at least one weather parameter is wind. At the processor, the real-time data for the at least one weather parameter is inputted into a computational fluid dynamics (CFD) model. At the processor, the CFD model is used with the inputted real-time data and the digital model of the outdoor football venue to produce three-dimensional wind vectors at grid-points in the digital model of the outdoor football venue. At the processor, the three-dimensional wind vectors are used to calculate a trajectory of the football at the outdoor football venue based on the real-time data obtained for the at least one weather parameter. The calculated trajectory of the football accounts for the impact of the at least one weather parameter, and the trajectory of the football is calculated using a selected cross-sectional area of the football, where the cross-sectional area of the football is selected based on whether the football is thrown, punted, or kicked. At least one of the calculated trajectory of the football and a calculation of the impact of the at least one weather parameter on the calculated trajectory of the football is displayed on a screen.

In accordance with another embodiment, a system is provided. The system includes a data storage that contains wind model data for an outdoor football venue, at least one processor, a machine-readable medium including instructions stored therein, and a display. The processor contains a digital model of the outdoor football venue. When the machine-readable medium is executed by the at least one processor, it causes the at least one processor to perform operations in real-time including: obtaining current weather data comprising wind data and calculating a trajectory of a football at the outdoor football venue, using the wind model data and the current weather data, taking into account impact of current weather conditions on movement of the football at the outdoor football venue based on the obtained current weather data for current weather parameters. Calculating the trajectory includes using a computational fluid dynamics model that generates three-dimensional wind vectors at the outdoor football venue, where the trajectory of the football is calculated using a selected cross-sectional area of the football. The cross-sectional area of the football is selected based on whether the football is thrown, punted, or kicked. The display outputs in real time the calculated trajectory of the football or calculations based on the calculated trajectory of the football.

In accordance with yet another embodiment, a computer-implemented method is provided for determining an impact of parameters on a flight of a football at a football venue in real time. At a processor, a flight of the football is calculated based on at least one of the parameters, wherein the parameters comprise an aim of a kicker and a spin of the football in flight. The flight of the football is calculated using a selected cross-sectional area of the football, the cross-sectional area of the football selected based on whether the football is thrown, punted, or kicked. At least one of the flight of the ball calculated by the processor and a deviation on the flight caused by at least one of the parameters is displayed on a screen.

BRIEF DESCRIPTION OF THE DRAWINGS

The invention, together with further objects and advantages thereof, may best be understood by reference to the following description taken in conjunction with the accompanying drawings in which:

FIGS. 8-9 are exemplary screenshots of spreadsheet application for determining the impact of weather on a baseball, in accordance with an embodiment.

DETAILED DESCRIPTION OF EMBODIMENTS

The present invention relates generally to a system and method for quantifying the impact of weather on the flight of balls at an outdoor venue. For example, embodiments described herein can be used to predict the flight of a ball at a given location based on weather conditions. Embodiments herein describe a system and method for collecting weather data at a location and using the data to predict the flight of a ball at the location based on weather conditions. The embodiments described herein can model the impact of weather parameters on the flight of a ball for any outdoor sport. It will be noted that the impact of weather on a sporting event can be predicted in advance. In some cases, the predictions can be made as much as four to five days in advance of the event.

Referring to FIGS. 1-4, embodiments of the system will be described. The system collects weather data and can use both historical and current weather data for a given location to determine the impact of the current weather on the flight of a ball in the location. The five most significant weather parameters on the flight of a ball, such as a baseball, are wind (both horizontal and vertical), humidity, temperature, barometric pressure, and precipitation. According to an embodiment, the model for predicting the impact of these weather parameters on the flight of a ball is based on the weighted contribution of each of the parameters is as follows: wind, humidity, temperature, barometric pressure, and precipitation. The relative contribution of these parameters varies based on the given conditions. For example, wind can have zero impact if it is not blowing or it can have nearly 100% of the impact if it is blowing at 50 mph. It will be understood that the five weather parameters do not all need to be factored into the calculations for determining the impact of weather conditions on the flight of a ball. For example, in some embodiments, it may be enough to factor in only wind and humidity. In other embodiments, wind and humidity as well as one or more of the other weather parameters may be considered.

Temperature is positively correlated with the flight of the ball. That is, the warmer the temperature, the farther the ball will fly. Relative humidity, on the other hand, is negatively correlated with the flight of the ball because a moist ball is less elastic than a dry ball and thus will leave the impact point more slowly than a dry ball will for a given impact speed. That is, the lower the relative humidity, the farther the ball will fly. Pressure is also negatively correlated with the flight of the ball. That is, the lower the pressure, the farther the ball will fly.

Figure 1A:
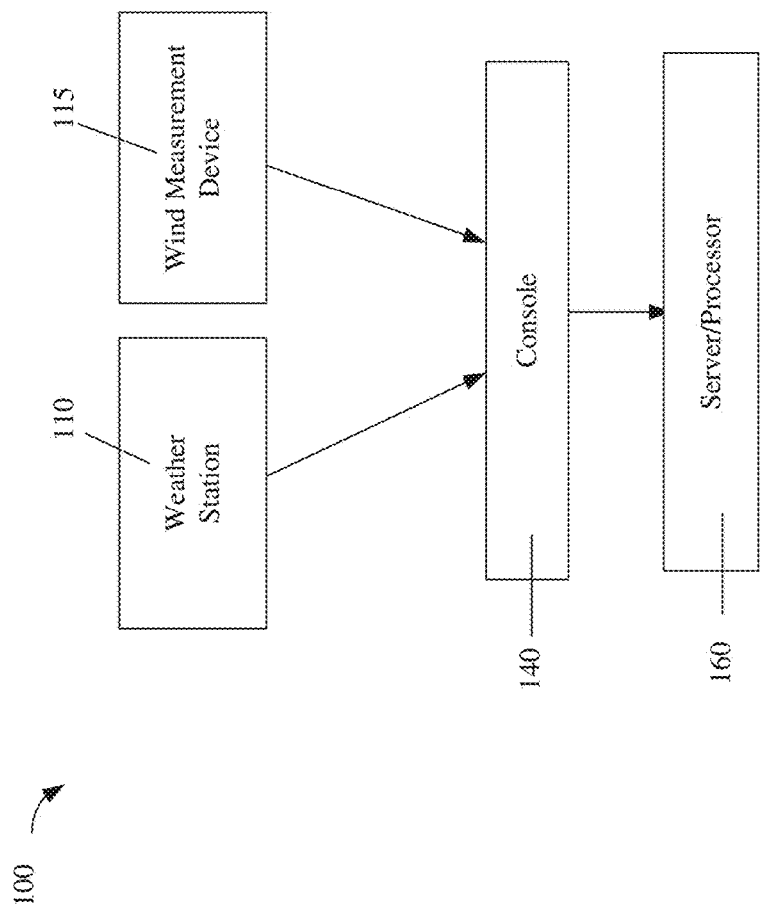
FIG. 1A is a conceptual schematic diagram of a system tor predicting the flight of a ball at a location in accordance with an embodiment.
Figure 1B:
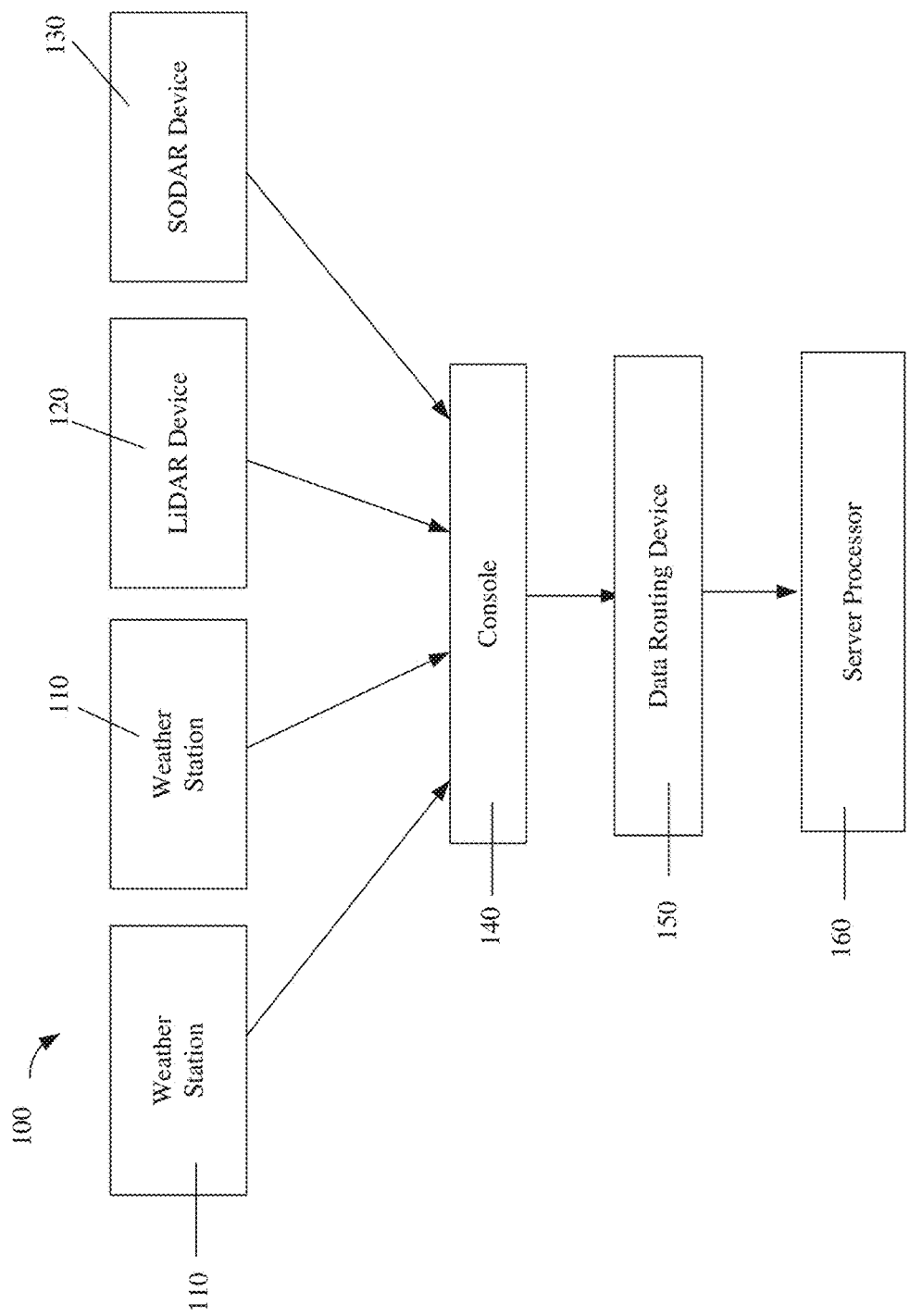
FIG. 1B is a conceptual schematic diagram of a system for predicting the flight of a ball at a location in accordance with another embodiment.

FIGS. 1A and 1B show conceptual schematic designs of embodiments of a system 100 described herein for predicting the flight of a ball based on wind, temperature, relative humidity, precipitation, and air pressure. In the embodiment shown in FIG. 1A, the system 100 includes a weather sensor 110, a wind measurement device 115, a weather console 140, and a server or processor 160. Wind measurement devices 115 include anemometers, LiDAR (Light Detection and Ranging) devices, SODAR (Sonic Detection and Ranging) devices, RADAR devices, and other instruments capable of measuring wind. Unlike anemometers, LiDAR, SODAR, and RADAR devices measure winds remotely. According to an embodiment, at least three wind measurement devices 115 are positioned at or near an outdoor sports venue to measure wind. As will be explained in more detail below, the vertical component of wind can have a significant impact on the flight of a ball.

Another embodiment of the system 100 shown in FIG. 1B includes weather sensors 110, a LiDAR device 120, a SODAR device 130, a weather console 140, a data routing device 150, and a server or processor 160. The data routing device 150 transmits the collected data to the server or processor 160. It will be understood that, in some embodiments, wind measurement instruments, such as anemometers, may be used in place of LiDAR and SODAR devices. In still other embodiments, a LiDAR and/or a SODAR device is used to measure wind. Thus, a system 100 typically includes one or more wind measurement devices 115. In some embodiments, the weather sensor 110 may include a wind measurement device and there is no need for a separate wind measurement device 115.

Figure 2:
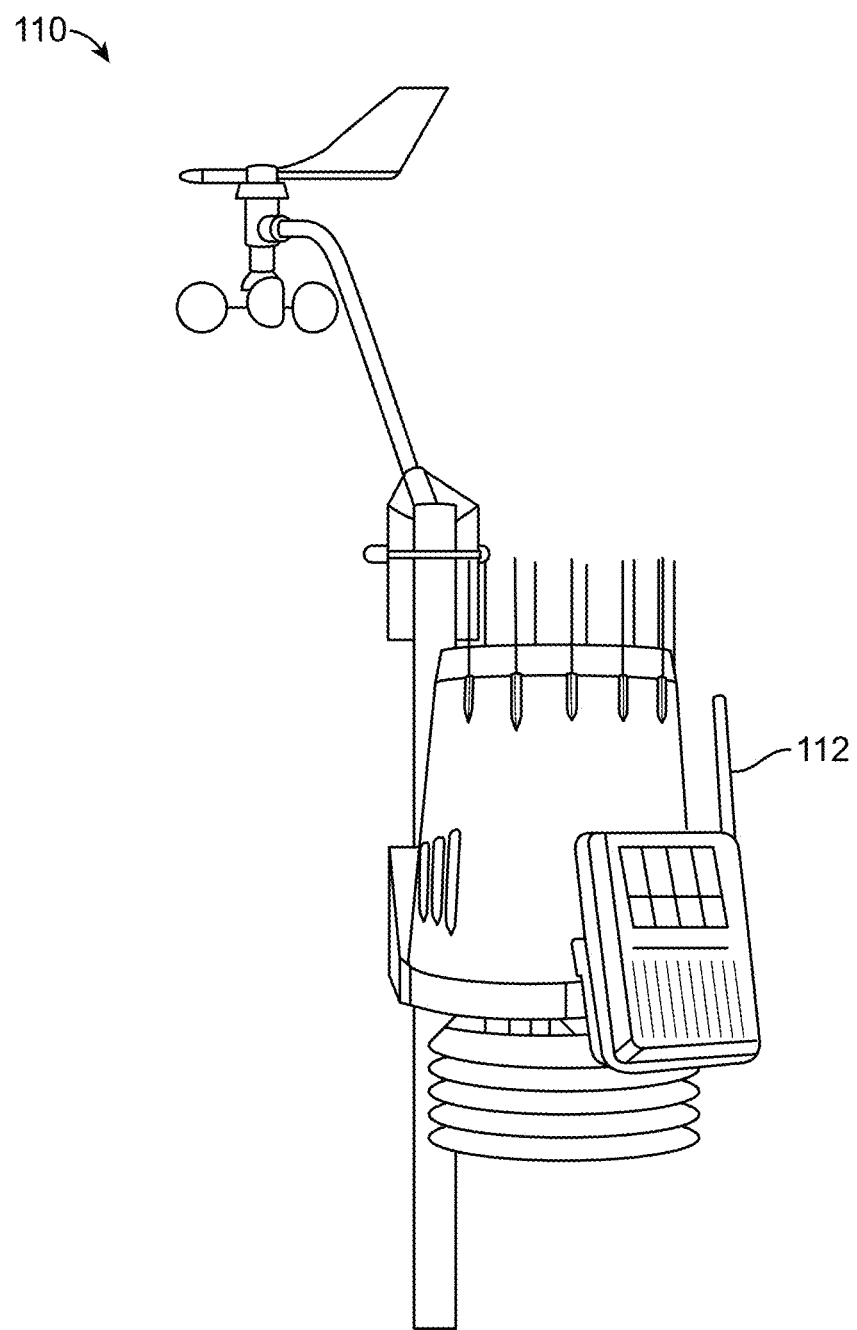
FIG. 2 shows an embodiment of a weather sensor that can be used in the systems shown in FIGS. 1A and 1B.
Figure 4:
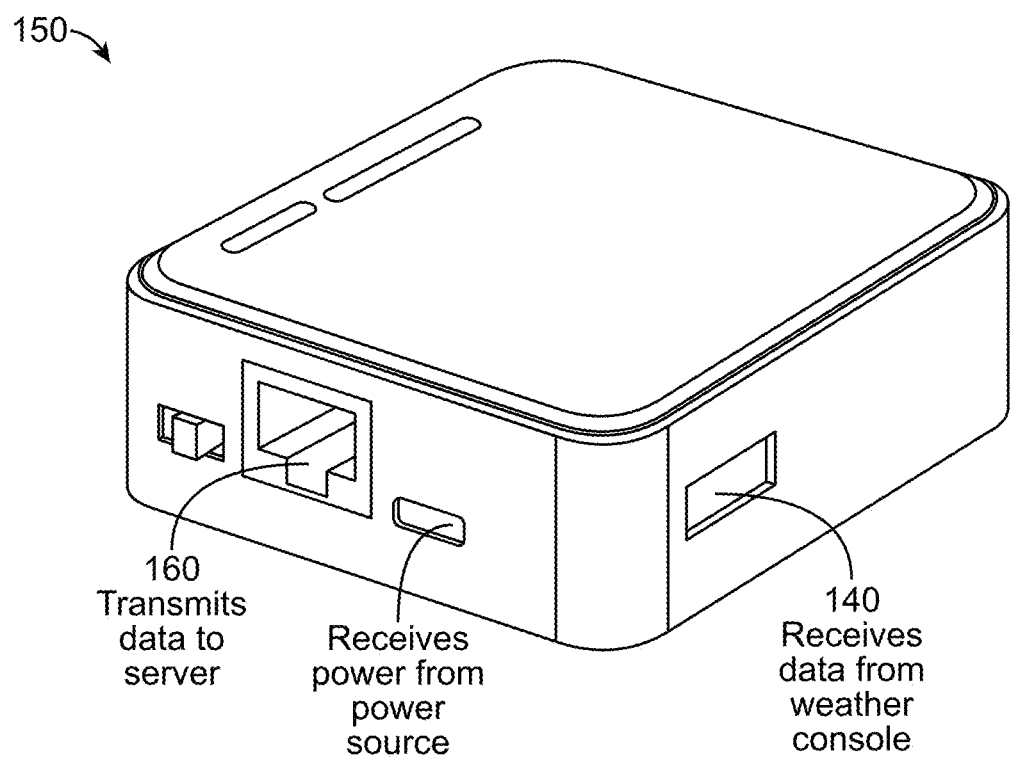
FIG. 4 shows an embodiment of a commercially available Meteobridge device that can be used in the system shown in FIG. 1B.

The weather sensors 110 in the embodiments described herein include sensors, including at least one of the following: thermometers for measuring temperature, humidity sensors for measuring humidity, anemometers for measuring wind speed, barometers for measuring air pressure, and gauges for measuring precipitation. A weather sensor 110 that can be used in the system 100 is shown in FIG. 2. Commercially available weather sensors that can be used in the system 100 include weather sensors from Campbell Scientific, Inc. of Logan, Utah and Davis Instruments Corporation of Hayward, Calif. It will be understood that other weather sensors that include thermometers and humidity sensors can also be used in the system. It will also be understood that, in other embodiments, the system 100 can be any number of thermometers, anemometers, and humidity sensors, barometers for measuring air pressure, and gauges for measuring precipitation as well as any number of LiDAR devices and SODAR devices and any number of data routing devices and weather consoles. It will be noted that a Meteobridge device, which is commercially available, is one approach to data transfer using a router connected to a network. FIG. 4 shows an embodiment of a commercially available Meteobridge device that can be used in the system shown in FIG. 1B. Other data transfer systems include cell modems, or radio transfer. A weather sensor 110 that can be used in the system 100 is shown in FIG. 2. The weather sensor 110 can include a thermometer, humidity sensor, and anemometer. According to another embodiment, a commercially available weather sensor from Campbell Scientific, Inc. includes two to ten pods positioned around the perimeter of a baseball stadium and each of the pods includes an anemometer and a gauge for measuring precipitation. In this embodiment, at least two of the pods also include a thermometer, barometer, and a humidity sensor.

Most of the time, wind has the most significant impact on the flight of a ball. Thus, in most circumstances, it is important to obtain accurate wind measurements. In smaller stadiums that have few obstructions (e.g., minor league baseball stadium or high school baseball field), wind measurements from standard anemometers (as describe above) positioned around the exterior of the field, can adequately represent the horizontal wind over the playing field. However, at larger sports stadiums with significant obstructions, wind flow over the field is much more complex. One example of this complexity is when wind flows over a large wall, the wall causes the flow downwind to become very turbulent. Such a flow is similar to that of a rushing stream as the water flows over a large rock. Thus, using anemometers to measure the wind around the exterior of the large stadium (having obstructions) does not provide enough useful information.

On larger sports fields, LiDAR and, to a lesser extent, SODAR devices can be employed to measure the wind over the field. What makes the LiDAR and SODAR devices most useful is that they measure wind remotely. That is, unlike the standard anemometer which measures wind only at its given location, the LiDAR AND SODAR devices measure wind at many distances (both horizontally and vertically) from where the device is located. LiDAR and SODAR devices make it possible to measure the wind over the sports field at several different heights and distances while the game is being played. Another benefit of using LiDAR and SODAR devices is that they can provide direct measurement of vertical wind. And in the cases where it is not possible to obtain this direct measurement of vertical wind, then the vertical wind can be calculated using the horizontal wind measurements that are measured using the LiDAR and SODAR devices. LiDAR devices 120 measure wind using light and SODAR devices measure wind conditions using sound. SODAR systems measure wind by emitting sound waves, primarily vertically. This limits the SODAR system's ability to measure wind over an entire sports field in real time. However, LiDAR systems emit light waves both vertically and horizontally, which allows for better coverage of wind measurements over an entire sports field. According to an embodiment, a LiDAR device 120 is installed in the stadium somewhere off the field where it continually scans the field to get the wind measurements. Instrumentation, including the commercially available Halo Doppler LiDAR, Zephir LiDAR, and/or other LiDAR instruments can be set up around the stadium to collect wind data. In a particular embodiment, the LiDAR device 120 in the system 100 is the commercially available Windcube®100S, manufactured by Leosphere and distributed in North America by NRG Systems. The embodiment described above uses only LiDAR and SODAR devices because at present they are the most cost-effective means of obtaining useful wind measurements. But RADAR devices may also be applicable in the future.

The weather sensors 110, LiDAR devices 120, and SODAR devices 130 can be positioned anywhere in the stadium to collect weather data. According to an embodiment, the weather sensors 110, LiDAR devices 120, and SODAR devices 130 are positioned along roofs of buildings or along the perimeter of a stadium, as these locations are typically unobstructed. In a particular embodiment at a baseball stadium, the weather sensors 110, LiDAR devices 120, and SODAR devices 130 are positioned about 40 feet beyond the center field fence but they can also be positioned behind home plate, or in the stadium along the right or left field line. In some embodiments, the weather measurement devices 110, 120, 130 can be solar powered or battery powered.

Figure 3:
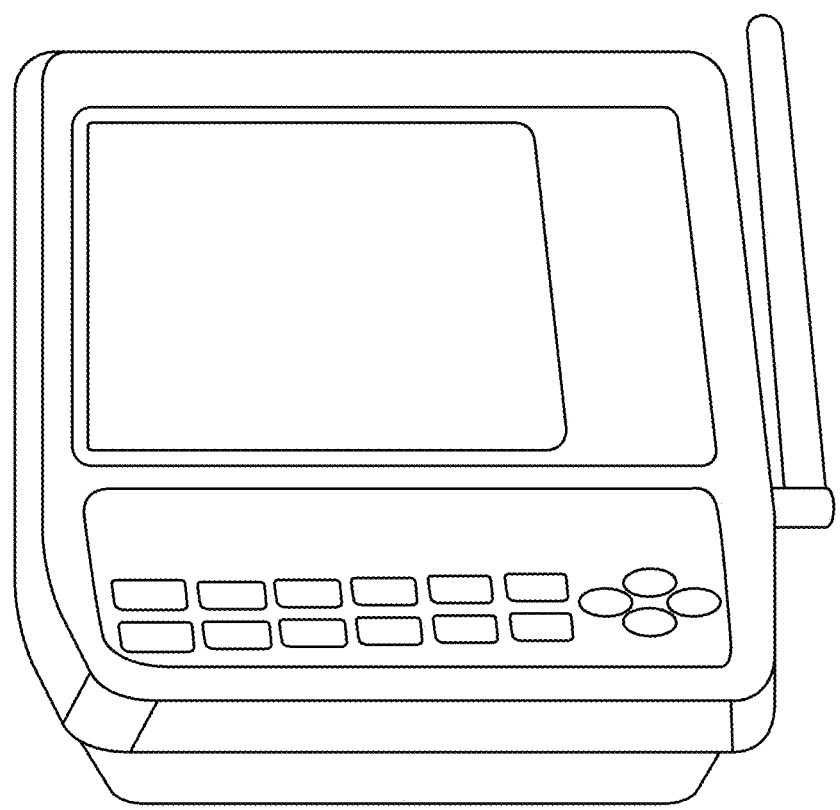
FIG. 3 shows an embodiment of a weather console that can be used in the systems shown in FIGS. 1A and 1B.

The weather data collected by the weather sensors 110, LiDAR devices 120, and SODAR devices 130 are transmitted, preferably wirelessly, to the weather console 140. It will be understood that the transmission of the weather data to the weather console can be either wired or wireless. According to an embodiment, the existing Wi-Fi at the stadium can be used for the wireless transmission. FIG. 3 shows an embodiment of a weather console 140 that can be used in the system 100. Davis Weather Instruments and Campbell Scientific have commercially available weather consoles. As shown in FIG. 2, a radio transmitter 112 is provided on each weather sensor 110 to transmit weather data collected by the sensors to the weather console 140. Radio transmitters can also be provided on the LiDAR devices 120 and SODAR devices 130 to transmit data to the weather console 140.

The weather console 140 then transmits the collected weather data to the data routing device 150. This transmission from the weather console 140 to the data routing device 150 can be either wired or wireless. The data routing device 150 then transmits the collected weather data to a server or processor 160, which then makes calculations, based on a model, to predict the impact of weather conditions on the flight of a ball. Different embodiments of models for predicting the flight of a ball are described in more detail below. The data routing device 150 allows the collected micro climate weather data to be transmitted to the server or processor 160, which can use both historical and current weather data to calculate the impact of weather on the flight of a ball. In other embodiments, other devices, such as a computer, rather than a data routing device can be used to connect the weather console 140 to the server or processor 160. It will be understood that, in some embodiments, the weather sensors 110, LiDAR device 120 and SODAR device 130 transmit the weather data directly to a server or processor 160 without a data routing device.

It will be understood that temperature, relative humidity, and barometric pressure are relatively static compared to wind, so weather sensors for measuring temperature, relative humidity, and barometric pressure can be positioned within and near the sports venue. Alternatively, weather model data for temperature, relative humidity, and barometric pressure obtained from other sources, such as the National Oceanic and Atmospheric Administration (NOAA) and other services, can be used. However, it will be noted that the three-dimensional wind field within the outdoor sports venue that impacts the flight of balls is much more difficult to measure directly with currently available technologies, such as LiDAR, RADAR, SODAR, etc. Therefore, an embodiment using computational fluid dynamics (CFD) described below can be used to determine the three-dimensional wind field within the outdoor sports venue. It will be noted, however, that actual weather sensors are more accurate than weather data obtained from public and commercial sources, especially for wind data. Furthermore, wind measurements using anemometers, LiDAR, RADAR, SONAR, etc. are more accurate than three-dimensional wind fields determined using a CFD model. CFD modeling, however, can be a more economical approach.

According to this embodiment, a Computer Aided Design (CAD) model is generated or otherwise obtained for the outdoor sports venue. According to an embodiment, the CAD model is generated for the outdoor sports venue as well as its surroundings, including a radius that is roughly about 10 times the length or diameter of the venue (depending on the shape of the venue). In other embodiments, the CAD model is generated for the outdoor sports venue and its surroundings, including a radius of about 2-20 times the length or diameter of the venue (depending on the shape of the venue).

As described in more detail below, using the CAD model, CFD modeling is used to produce three-dimensional wind vectors at different grid-points in the digital model of the outdoor sports venue. The CFD model collects historical wind data upstream of the sports venue to produce a set of three-dimensional wind cases, which can then be archived and retained for future use. This historical weather data that is archived can be used in conjunction with real-time or forecast weather data to generate real-time or forecast three-dimensional wind fields in the sports venue. The archived set of historical three-dimensional wind cases should include at least 10 different wind cases for a particular venue on a given day. It will be understood that fewer archived wind cases are needed for venues in locations with fairly consistent winds. If winds are more varied for a location, more archived wind cases are necessary for more accurate calculations of real-time three-dimensional wind fields.

The wind upstream of the outdoor sports venue can then be measured. The most common way to measure the wind is with standard anemometers positioned upstream of the venue. However, wind can also be measured using other technologies, such as LiDAR, RADAR, SODAR, etc. Alternatively, as noted above, other weather model data (e.g., public or commercial sources), can be used instead for estimated real time or forecast winds.

After the upstream wind data is obtained, that upstream wind data is matched or interpolated to the nearest surrounding archived historical CFD cases to determine the three-dimensional wind field in the sports venue in real time (or forecasted).

The real-time three-dimensional wind field (along with temperature, relative humidity, and barometric pressure) is then used to calculate how the weather is either impacting the flight of a specific ball or how the weather will generally impact the flight of an average ball. These calculations are explained in more detail below. Similarly, forecast weather data can be used to determine how the weather will affect the flight of a ball in the future.

Figure 5A:
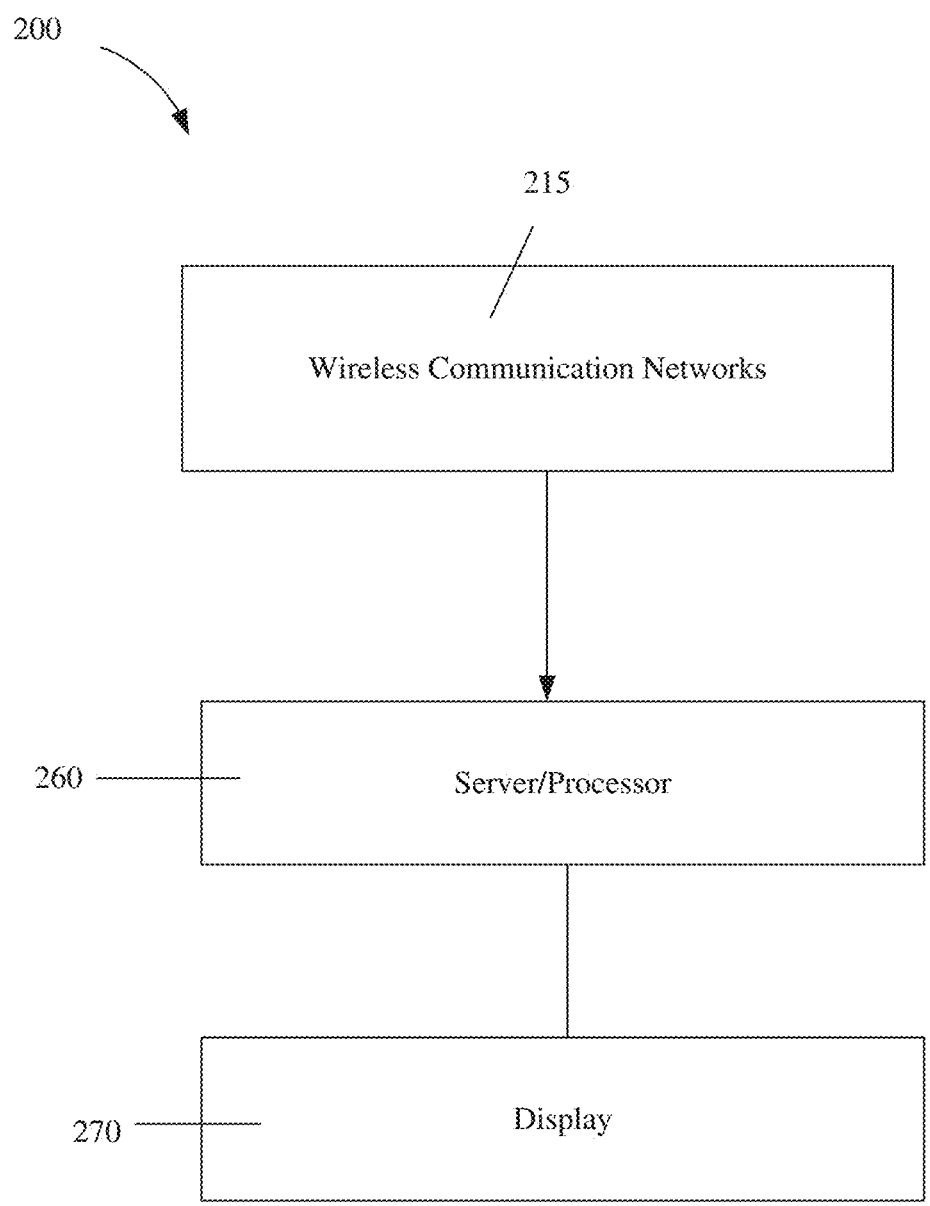
FIGS. 5A and 5B are conceptual schematic diagrams of a system for predicting the flight of a ball at a location in accordance with different embodiments.

According to an alternative embodiment of a system 200, instead of collecting weather data from weather sensors positioned at or near the outdoor sports venue, wireless communication networks 215 are used instead to collect cellular transmission signals to generate real-time weather data. As shown in FIG. 5A, the real-time weather data is transmitted, preferably wirelessly, from wireless communication networks 215 to the server or processor 260. In an embodiment, the real-time weather data from wireless communication networks 215 is obtained from commercial entities, such as Synoptic Data, which provides such weather data sourced from wireless communication networks. The weather data is produced by analyzing the quality of cellular transmission signals in the location. The collected weather data can then be used to calculate how the weather is either impacting the flight of a specific ball or how the weather will generally impact the flight of an average ball. As noted above, CFD modeling can be used in such calculations.

According to an embodiment, microwave link data, including signal attenuation information, are acquired from the cellular transmission signals at locations at or near the outdoor sports venue. A microwave link is a wireless signal connection between two separate antennas operating at frequencies above 1.8 GHz.

The microwave link data from different data points are aggregated and then processed, using a data transform, to produce the weather data. The processing includes analyzing the signal quality from various devices, such as cell phones, tablets, laptops, street cameras, connected vehicles, and other Internet of Things devices, to produce the weather data. The analysis is based on the knowledge of how the cellular transmission signal should look (signal quality) without any weather interference, and that different weather phenomena (e.g., precipitation, wind, temperature, etc.) have an effect on the signal. By analyzing the signal quality, the weather phenomena can be determined to produce the weather data. The weather data can be extremely localized (e.g., to the sports venue or even a particular location within the sports venue), as there are many hundreds of millions of data points based on the cellular transmission signals at any given time, and the weather data can be updated frequently—as often as every five minutes, and possibly as often as a few seconds. For example, it is well known that precipitation attenuates microwave signals at frequencies above 5 GHz. Thus, the attenuation of the microwave signals can be analyzed to determine whether the attenuation is caused by precipitation and also determine the intensity of the precipitation. Similar analysis may be performed for other weather phenomena, such as wind, temperature, humidity, etc.

Figure 6A:
FIGS. 6A and 6B are exemplary outputs on a screen display showing the effect of weather on the trajectory of a ball.
Figure 6B:
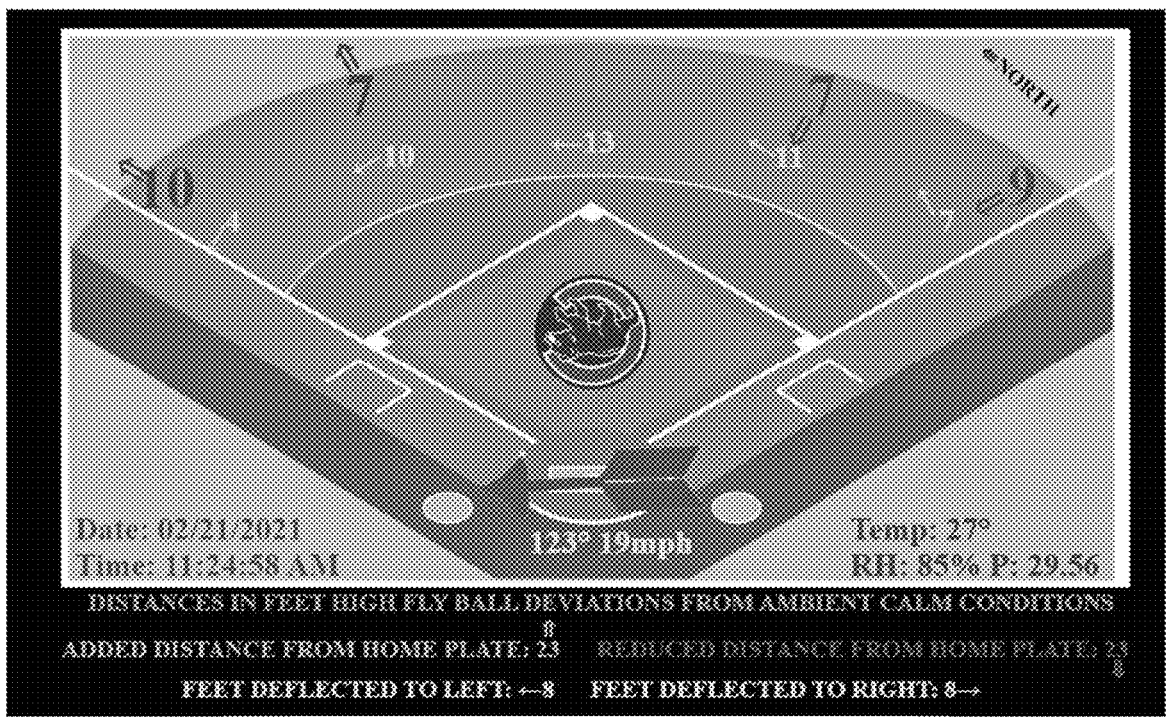

As described in detail below, calculations can be made to determine the trajectory of the ball as affected by the weather. The server 260 can transmit the calculated trajectory of the ball to a display screen 270, as illustrated in the exemplary screenshot display of FIG. 6A. As shown in FIG. 6A, the trajectory of the actual ball flight, as affected by weather, is shown by the solid line and the trajectory of a ball (not affected by wind) is shown by the dashed line. The displayed trajectory can be an animation of the trajectory. FIG. 6B is an example of another display in which the effect of the current or forecast wind will have on a baseball that is hit from home plate. The arrows in FIG. 6B show the wind direction and the direction in which the wind is pushing or will push a ball. This display shows how much the flight of the ball is shortened or lengthened by the wind and how much the ball is pushed to the left or right by the wind. The numbers next to the arrows are the calculated magnitude of deviations based on the effect of the wind on the baseball. The wind direction and magnitude of deviations can be updated and displayed frequently, as often as every few seconds.

Figure 5B:
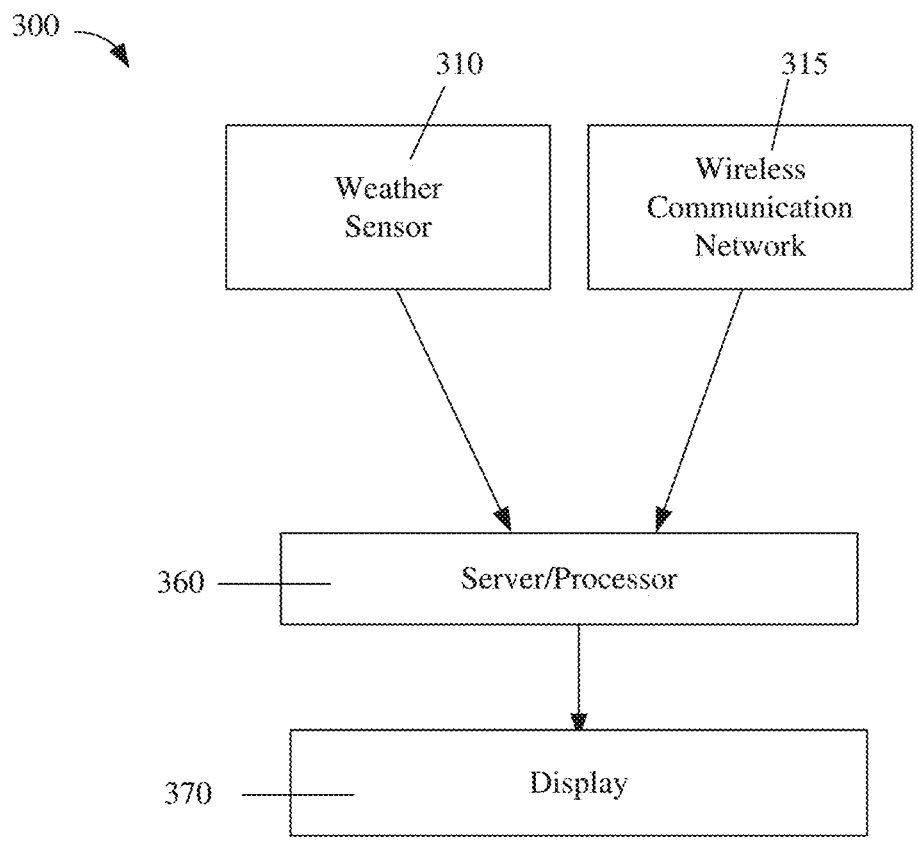

Alternatively, the weather data can be obtained from public sources, such as NOAA, Weather Underground, and Davis Instruments, which have their own weather sensors for collecting weather data. In some embodiments, a combination of weather data measured by weather sensors and weather data collected from wireless communication networks is used. According to an embodiment of the system 300 shown in FIG. 5B, weather data is collected from both weather sensors 310 and from wireless communication networks 315. In this embodiment of the system 300, the weather data collected from weather sensors 315 can be collected from sensors operated by NOAA, Weather Underground, etc. or from a weather sensor, such as a weather sensor 110, LiDAR devices 120, and SODAR devices 130, that is at or near an outdoor sports venue, such as a stadium, golf course, or another type of sports field. In this embodiment, the weather data from weather sensors and from wireless communication networks are transmitted, preferably wirelessly, to the server or processor 360. According to an embodiment, weather data from all of the sources can be used by the server or processor 360 to calculate the effect of the weather parameters on the flight of a ball, as will be described in more detail below.

As described in detail below, calculations can be made to determine the trajectory of the ball as affected by the weather. The server 360 can transmit the calculated trajectory of the ball to a display screen 370, as illustrated in the exemplary screenshot display of FIG. 6A. The displayed trajectory can be an animation of the trajectory. As shown in FIG. 6A, the trajectory of the actual ball flight, as affected by weather, is shown by the solid line and the trajectory of a ball (not affected by wind) is shown by the dashed line.

FIG. 6B is an example of another display in which the effect of the current or forecast wind will have on a baseball that is hit from home plate. The arrows in FIG. 6B show the wind direction and the direction in which the wind is pushing or will push a ball. This display shows how much the flight of the ball is shortened or lengthened by the wind and how much the ball is pushed to the left or right by the wind. The numbers next to the arrows are the calculated magnitude of deviations based on the effect of the wind on the baseball. The wind direction and magnitude of deviations can be updated and displayed frequently, as often as every few seconds.

According to another embodiment, weather data from weather measurement devices 110, 120, 130 positioned at or near the sports venue are used by the server or processor calculate the trajectory of a ball as impacted by weather, and the weather data sourced from wireless communication networks are used as backup weather data in the event the weather measurement devices 110, 120, 130 malfunction or are otherwise inoperable. Thus, if the server or processor determines that it is no longer receiving weather data from the weather measurement devices 110, 120, 130, the server or processor will begin receiving weather data from wireless communication networks. Similarly, in another embodiment, the weather data obtained from weather measurement devices 110, 120, 130 positioned at or near the sports venue are used as backup weather data in the event weather data sourced from wireless communication networks are unavailable. Thus, if the server or processor determines that it is no longer receiving weather data from wireless communication networks, the server or processor will begin receiving weather data from the weather measurement devices 110, 120, 130.

According to embodiments, the system 100, 200, 300 uses wind, temperature, relative humidity, air pressure, and precipitation to calculate how many feet are being added to or subtracted from the flight of an average ball hit to the average distance to the outfield fence of a baseball stadium. These weather factors can also be used to calculate how many feet are being added to or subtracted from the flight of a ball thrown to home plate from an outfielder as well as balls thrown by a pitcher. These weather factors can also be used to calculate how much slower or faster a ball thrown in from the outfield to home plate will travel. It will be understood that, while a large portion of the description herein is applied to baseball, the models described herein can be applied to other sports, including football, golf, cricket, tennis, soccer, archery, rowing, bike racing, car racing, etc.

According to an embodiment, a model for predicting the flight of a ball at a given stadium is created by first analyzing long-term weather data sets, such as those collected by nearby weather sensors 110, LiDAR devices 120, and SODAR devices 130 or weather data sets specific to the site sourced from wireless communication networks. From the historical weather data collected at the site, an "average day" is established. That is, when each weather parameter (excluding wind and precipitation) is at its long-term average for the start of the baseball game, then the sum of the parameters' influence on the ball must equal zero. The impact of wind on the ball can only be zero when there is no wind at all. Otherwise, the wind's influence on the ball is either positive or negative, left or right, and up or down. The influence of precipitation on the flight of the ball is only negative, as the heavier the precipitation, the more negative the impact on the flight of the ball. The model works by taking each parameter (except for wind and precipitation) and adding to (or subtracting from) the average day when the weather parameter enhances (or reduces) the flight of the ball. It will be understood that no two baseball stadiums (or any other type of stadiums) will have the exact same model, although they will generally be similar.

As noted above, there are five weather parameters that have an impact on the flight of a ball: temperature, relative humidity, barometric pressure, precipitation, and wind. The model used in a particular embodiment described herein is based the sport of baseball and on the flight of a baseball that travels a distance of 375 feet, which is the average distance of the outfield wall from home plate. It will be understood that since the average distance to the outfield wall is different for each stadium, this number will vary for each stadium. The influences of the different weather parameters are calculated to predict the flight of a ball, based on models that will be explained in greater detail below.

A brief summary of the weather influences on the flight of a baseball (or any type of ball) under most conditions is roughly as follows. Temperature increases the distance of the flight of a ball by approximately three feet for every 10 degree increase in temperature on the Fahrenheit scale. Humidity decreases this distance by approximately six feet for every 10% increase in humidity. Pressure increases this distance by approximately seven feet for every inch decrease in mercury. The wind influence on the distance of the flight of a ball is much more complex. Headwinds hamper the flight of a ball more than the addition to the flight of a ball from equal tailwinds. Downward wind has an adverse impact on the flight of a ball, while upward wind enhances the flight of a ball. The influence of the weather parameters on the flight of a ball are discussed in more detail below.

An example will be described below to illustrate the calculations performed by the system 100. Average values (except wind and precipitation) for each parameter are used as the basis for the calculations. It will be understood that these average values are exemplary and are based on a particular location. For illustration purposes, in a particular example, the following are assumed: the average temperature is 81° F., the average humidity is 59%, and the average pressure is 29.92 inches of mercury. The server or processor 160 calculates an index value of how many feet are being added to left field, center field, and right field. Data are collected at the field and transmitted to the server. The software screens the data for accuracy, and then the data is fed into the model, which calculates how many feet the weather is adding to or subtracting from the average fly ball hit 375 feet. The calculations in this embodiment are based around the flight of an idealized or average ball hit to the warning track, which is assumed to be about 375 feet from home plate. In other embodiments, where actual flight data is available, specific impacts of weather on that given ball can be calculated. In accordance with an embodiment, the calculations are displayed on a screen. According to an embodiment, the calculations are uploaded to a website and can be frequently updated (e.g., every 2-3 seconds).

It will be understood that, as the different weather parameters are measured in different units, each parameter must be multiplied by a particular predetermined coefficient in order to scale each parameter so that it has the appropriate contribution to the flight of the ball. What are illustrated here are averaged simplified estimates of the influences of each weather parameter. As will be explained in more detail below, there are 90 different configurations for coefficients in a particular embodiment. That is because there are a number of calculations published in the scientific literature for drag coefficient, lift coefficient, and spin rate decay. In the model used for calculations in this embodiment, the coefficient of each of the parameters is provided below:

Temperature Coefficient=−0.3
Humidity Coefficient=0.6
Pressure=7
Wind=Varies based on the speed and direction of the wind and the spin of the ball
Precipitation=Varies based on how hard the precipitation is falling Temperature is positively correlated with the flight of the ball. That is, the warmer the temperature, the farther the ball will fly. This correlation is represented mathematically by Equation (1) to determine the contribution of the temperature to the impact caused by weather on the flight of the ball:

$$\text{Temp.}=\text{Temp. Coefficient}*(\text{Average Temp.}-\text{Actual Temp}) \quad (1)$$

Relative humidity, on the other hand, is negatively correlated with the flight of the ball because a moist ball is less elastic than a dry ball and thus will leave the impact point more slowly than a dry ball will for a given impact speed. That is, the lower the relative humidity, the farther the ball will fly. This correlation is represented by the following equation to determine the contribution of the humidity to the impact caused by weather on the flight of the ball:

$$\text{Humidity}=\text{Humidity Coefficient of } 0.6*(\text{Average Humidity}-\text{Actual Humidity}) \quad (2)$$

Pressure is also negatively correlated with the flight of the ball. That is, the lower the pressure, the farther the ball will fly. This correlation is represented by Equation (3) to determine the contribution of the air pressure to the impact caused by weather on the flight of the ball:

$$\text{Pressure}=\text{Pressure Coefficient}*(\text{Average Pressure}-\text{Actual Pressure}) \quad (3)$$

Horizontal wind is treated as forward and backward. Forward wind is a tailwind, which increases the flight of the ball. Backward wind is a headwind, which decreases the flight of the ball. Any wind that is not directly forward or backward is broken down into its component parts so that a forward or backward wind can be used. For vertical wind, up is positive and down is negative. In some embodiments, vertical wind is assumed to be zero. Typically, vertical wind will not be assumed to be zero for larger stadiums.

A home run takes an average of 4-4.5 seconds from the time the ball is hit until the time the ball lands. The average home run ball reaches a maximum height of about 80 feet in elevation. The average home run ball spends about 3 seconds above 50 feet and below 100 feet in elevation. Thus, the wind that will have the biggest influence on the flight of the ball is between 50 and 100 feet in elevation.

It is clear that the wind's influence on the ball is not constant over its trajectory. In an embodiment, average wind speed from 50 to 100 feet in elevation is used in the model. In a larger stadium system, where LiDAR (or SODAR) can be used, the actual measured wind speed (not an average wind speed) is used in the model. Wind is represented mathematically as set forth below.

Horizontal wind is measured and then broken down into its component parts on an X-Y axis, where the X-axis runs from home plate in the direction that the ball initially leaves the bat, and the Y-axis runs to the left of that direction. Thus a ball hit initially toward $2^{nd}$ base will have the X axis increasing toward centerfield and the Y axis increasing toward $3^{rd}$ base along a line running from $1^{st}$ base to $3^{rd}$ base.

The X-component of the wind is calculated using Equation (4):

$$X\text{-component of Wind}=\text{Speed of Wind}*\text{Cosine}(\text{Ball Park Orientation}+\text{Ball Angle Wind Direction}) \quad (4)$$

where Ball Park Orientation is the direction in degrees (where 360 degrees is north and 180 degrees is south) of the line that runs from home plate to straight-away center field and Ball Angle is 0 degrees for a ball initially hit towards center field and +/−45 degrees for a ball initially hit toward right/left field. For a Ball Park Orientation of 360 degrees, home plate would be north of straight-away center field. The Y-component of the wind is calculated using Equation (5):

$$Y\text{-component of Wind}=\text{Speed of Wind}*\text{Cosine}(\text{Ball Park Orientation}+\text{Ball Angle}+90-\text{Wind Direction}) \quad (5)$$

A headwind shortens the flight of a ball more than a tailwind lengthens the flight of the ball. The influences of wind on the flight of a ball are non-linear and include drag, lift, and gravity forces.

Precipitation only detracts from the flight of a baseball. When the ball becomes wet, it becomes heavier, which causes the ball to travel a shorter distance than it would have if it were dry. Additionally, a wet ball is more "spongey," which causes the ball to leave the bat with a lower initial velocity than it would have if the ball were dry. The impact of precipitation is calculated using Table 1 below. It will be understood that Table 1 is merely an example of quantification of the impact of precipitation.

TABLE 1

| Rain Amount | 0.151 | 0.091 | 0.041 | 0.021 | 0.011 | 0.001 | 0.000 |
|---|---|---|---|---|---|---|---|
| 5 Mins Ago | −100 | −100 | −90 | −60 | −45 | −35 | 0 |
| 10 Mins Ago | −70 | −40 | −25 | −15 | −10 | −6 | 0 |
| 15 Mins Ago | −36 | −17 | −10 | −7 | −5 | 0 | 0 |
| 20 Mins Ago | −32 | −14 | −7 | 0 | 0 | 0 | 0 |
| 25 Mins Ago | −28 | −11 | 0 | 0 | 0 | 0 | 0 |
| 30 Mins Ago | −24 | −8 | 0 | 0 | 0 | 0 | 0 |
| 35 Mins Ago | −20 | −5 | 0 | 0 | 0 | 0 | 0 |
| 40 Mins Ago | −16 | −2 | 0 | 0 | 0 | 0 | 0 |
| 45 Mins Ago | −12 | 0 | 0 | 0 | 0 | 0 | 0 |
| 50 Mins Ago | −8 | 0 | 0 | 0 | 0 | 0 | 0 |
| 55 Mins Ago | −4 | 0 | 0 | 0 | 0 | 0 | 0 |
| 60 Mins Ago | 0 | 0 | 0 | 0 | 0 | 0 | 0 |

The contribution of each parameter (e.g., temperature, humidity, pressure, wind, and precipitation) is calculated and then summed together to obtain the net impact on the flight of the ball.

Figure 8:
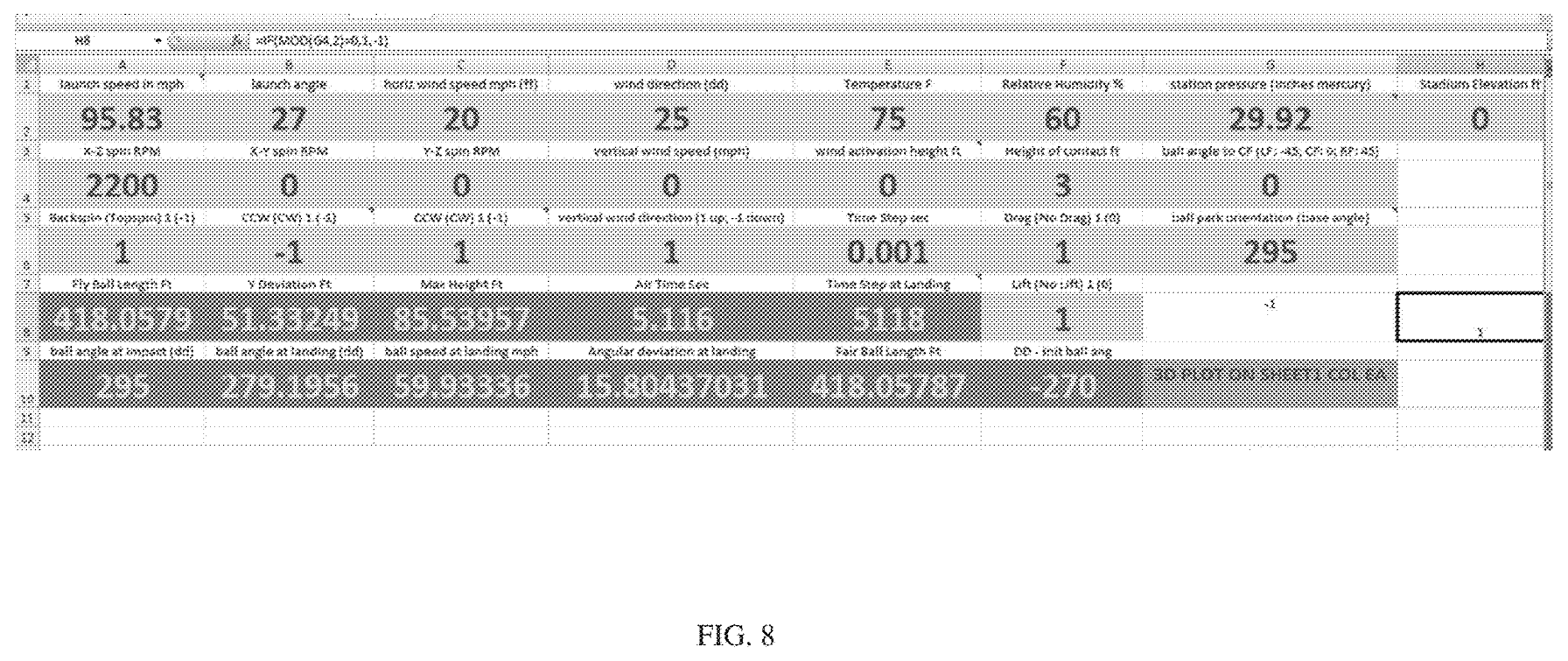
Figure 9:
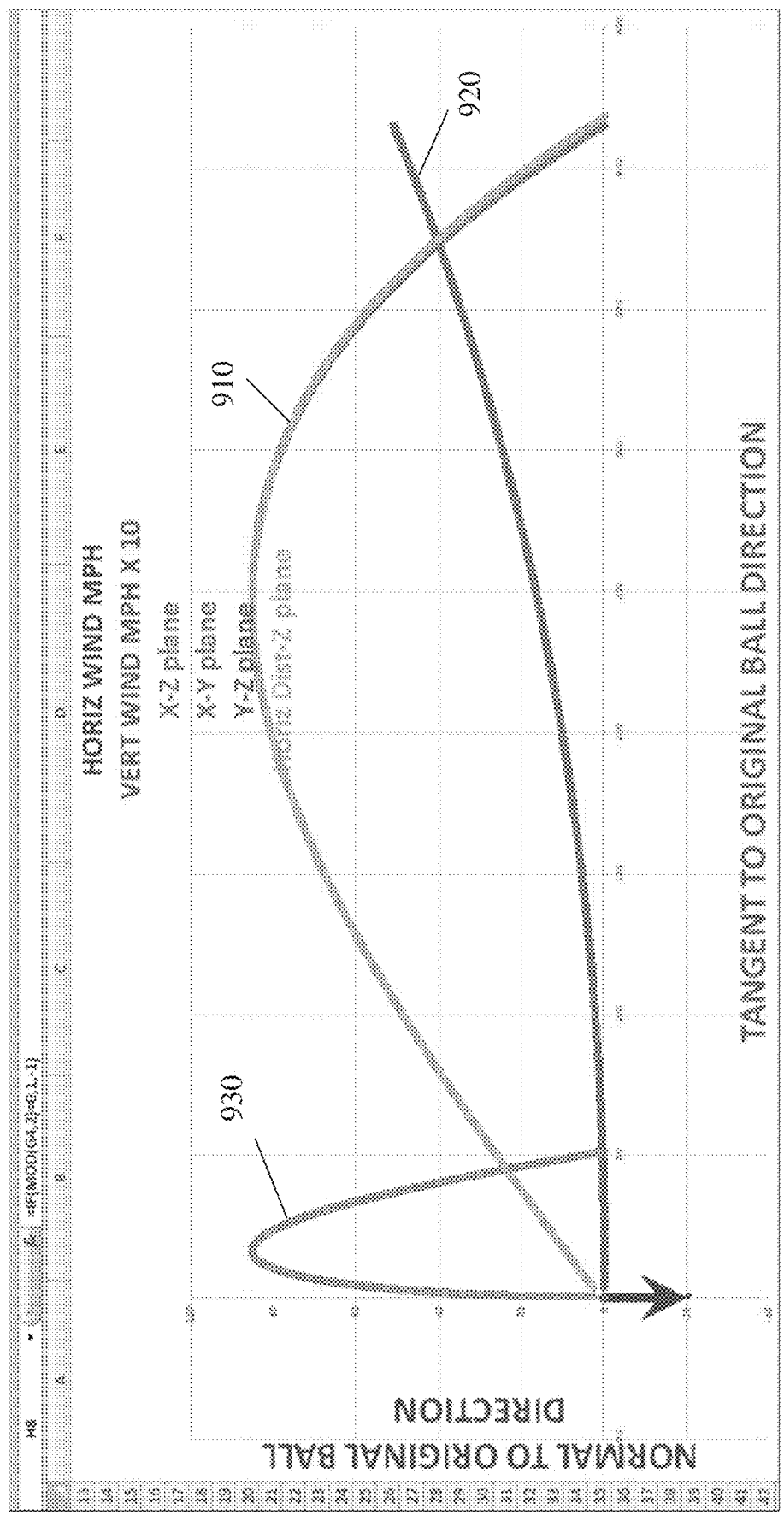

In a particular embodiment, the model that is used to predict the impact of weather parameters on the flight of a ball resides on an application, such as, for example, a spreadsheet that can receive various inputs and calculate the flight of the ball based on the weather conditions. Various pages of the spreadsheet of this embodiment are shown in FIGS. 8-9. The model illustrated in FIGS. 8-9 is used for baseball. However, it will be understood that the model can be modified to determine the influence of weather on the flight of a ball in other sports, including football, golf, cricket, and volleyball.

As the specific model illustrated in FIGS. 8 and 9 is based on baseball, the forces that affect the flight of a baseball will be discussed below. There are three vectors (forces) that act on a baseball while it is in flight. These vectors are gravity, drag, and the lift or magnus force. At each instantaneous moment the ball's velocity is traveling in a specific direction, and the angle between this direction and the ground is the ball's current angle of orientation. The drag force always acts in the opposite direction of the velocity vector. The lift or magnus force acts perpendicularly to the spin axis of the ball, and generally points away from the ground (assuming the ball is hit with backspin). Gravity always pulls the ball directly from its center of mass straight to the ground, so the direction of the force of gravity is independent of the ball's orientation.

Gravity is the natural force that pulls all objects (including the ball) towards the earth. The force of gravity is fairly simple, and is easily determined by multiplying the constant acceleration of gravity g by the mass of the ball M. Thus, the force of gravity on the baseball is M*g.

Calculating the drag force is much more complex. Drag force is the force of air resistance that slows the ball down. Physically put, the drag force is equal to 0.5 multiplied by the air density (rho), multiplied by the cross-sectional area of the ball and the drag coefficient, and then finally multiplied by the ball's air speed squared. Thus, the drag force=$0.5*rho*A*Cd*V_a^2$. Rho or air density is a measure of how tightly air is packed. A rise in temperature, or a lowering of pressure, results in a lower air density. There are three different options for calculating air density and the most common is the following equation: rho=P/(RdT).

According to this embodiment, initial parameters for the flight of the ball, such as the ball's launch speed, launch angle, spin rate (in all directions), and spin rate decay, are input using a spreadsheet, such as the one shown in FIG. 8. As shown in FIG. 8, these initial parameters are entered into the spreadsheet in appropriate places, either manually by a user or received from a source. Each initial parameter will be discussed below.

Launch speed (mph), launch angle (degrees), and spin rate (rpm) are routinely measured by all major league baseball teams for all of their teams (both minor and major league). According to an embodiment being used in real time, an average of each of launch speed, launch angle and spin rate is received by the application (spreadsheet) as inputs. The weather parameters (horizontal wind speed, wind direction, temperature, relative humidity, station pressure, and precipitation are measured with weather instruments, such as those described above. The inputs of the weather parameters can be received by the server or other processor from the weather instruments via wireless transmission, as described above. In some embodiments, the stadium elevation is also entered, as it is sometimes important for including in the adjustment calculation of station pressure.

X-Z spin is the spin of the ball about the Y axis. This is spin that would rotate counterclockwise or clockwise from a right field view perspective of the ball flight, where the Z direction runs from the ground vertically straight up in the air, and the X direction runs from home plate in the initial horizontal direction that the ball leaves the bat. Thus, the Y-axis runs in the horizontal plane perpendicular and to the left of the X direction as viewed from home plate. This spin results in an up or down motion, which would cause a change in the lift coefficient, and therefore used in some of the embodiments of the model described herein. The X-Z spin is typically tracked by Doppler radar and these statistics are provided by major league baseball teams.

X-Y spin is the component of spin of the ball about the Z axis. This is spin that would rotate counterclockwise or clockwise from a bird's eye view perspective of the ball flight, where the X and Y directions are as defined above. Normally, a baseball hit to center field has very little spin along this axis, while a baseball hit to left field would have positive (counterclockwise) spin and a baseball hit to right field would have negative (clockwise) spin, but any spin would cause a change in the lift coefficient.

Y-Z spin is the spin of the ball about the X axis. This is spin that would rotate counterclockwise or clockwise from a center field view perspective of the ball flight, where the X, Y, and Z directions are as defined above. This spin results in side to side motion as well as up and down motion, and can be calculated given the angle spin which is readily available from the teams' databases. However, it will be noted that the Y-Z spin is normally negligible.

According to some embodiments, vertical wind speed is assumed to be zero, but actual vertical wind speed can be measured or calculated with LiDAR or SODAR measurements in larger stadiums. Wind Activation Height is the height at which the wind is assumed to start acting on the ball. That is, there is zero wind at the surface and it generally increases with increasing height. In order to calculate the impact of the wind on the ball, wind is assumed to be about one half the actual wind speed below the Wind Activation Height. In the illustrated embodiment, the wind Activation Height is assumed to be ground level, as shown in FIG. 8.

Height of Contact is the height above the ground that the ball is hit. For baseball, this is most often assumed to be an average of 3 feet above the ground. Ball Angle to CF is the angle of the ball hit in relationship to center field, and can also be tracked by Doppler RADAR. Thus, if a ball is hit directly to center field, this value will be zero. If a ball is hit to left of direct center, this value will be between −45 and zero. If a ball is hit to right of direct center, this value will be between zero and +45.

Backspin (Topspin) is counter-clockwise X-Z spin (see above), where 1 is backspin and −1 is topspin. This is used in calculating the upward or downward movement of the ball, as a ball with backspin is ascending and a ball with topspin is descending. This is used to calculate the direction and magnitude of spin in each direction, which impacts the lift coefficient (to be explained later).

In this embodiment, CCW (CW) is counter-clockwise X-Y spin (see above), where 1 is a ball spinning counter-clockwise (clockwise) as viewed from above. This would cause the ball to track to the left (right). This is used to calculate the direction and magnitude of spin in each direction, which impacts the lift coefficient (explained in further detail below).

According to this embodiment, CCW (CW) is counter-clockwise Y-Z spin (see above), where 1 is a ball spinning counter-clockwise (clockwise) as viewed from home plate. This would cause the ball to track to the left (right). This is used to calculate the direction and magnitude of spin in each direction, which impacts the lift coefficient (explained in further detail below). In this embodiment, for Vertical Wind Direction, 1 means upward wind and −1 means downward wind.

Time step is the time interval in seconds that the ball is tracked through its flight. So a value of 0.001 has the ball being tracked every one thousandth of a second. This can be changed to accommodate any desired interval. It will be noted that the direction in which the ball is hit and the spin characteristics of the ball are tracked, using a device, such as Doppler RADAR.

In this embodiment, Drag (No Drag) is a switch to turn on or off the Drag coefficient. This is useful for doing theoretical calculations in a vacuum, when the Drag is set to zero. Drag coefficient will be discussed in more detail below, but a quick summary is that it is the friction applied by the air against the ball as it travels. There are eight different values referenced in the scientific literature for drag coefficient. Each of these has mathematical justification. As it is not clear which of these is the most accurate, the user can either select from one of the eight possibilities or take an average of the eight.

Ball park orientation is the angle (stated in 1 to 360 degrees) where straight-away center is pointing based on a line that extends from home plate, over second base, to straight-away center field.

Lift (no Lift) is a switch to turn on lift coefficient, where 1 is on and 0 if off. This is useful for theoretical calculations where the ball has no lift. Lift coefficient is related to the Bernoulli equation and it essentially is how the backspin of the ball helps it rise as it travels. There are five different values referenced in the scientific literature for lift coefficient. Each of these has mathematical justification. As it is not clear which of these is the most accurate, the user can either select from one of the five possibilities or take an average of the five.

After all of the above inputs are entered, then the flight of the ball is calculated and important variables are output and displayed on a screen, as shown in FIG. 8. The displayed variables can include the calculated fly ball length, maximum height of the ball, ball angle at landing, ball speed at landing, etc.

After the calculations are performed, a visual graph of the ball flight can be displayed on a screen, as shown in FIG. 9. In FIG. 9, Line 910 shows the view looking in from right field. Line 920 shows the view from above where the ball originates at home plate (left) and ends in the outfield (right). Line 930 represents the view of the ball from straight-away center field, based on the inputs received, as shown in FIG. 8.

It will be understood that the embodiment described above with reference to FIGS. 8-9 applies to baseball. It will be understood that this method can be tailored to different types of balls (based on the size, mass, cross-section, material (drag coefficient), etc. of the ball) used in different sports. Thus, the following constants are used in the calculations set forth below in order to provide the calculations and visual graph displayed, as shown in FIG. 9:

Mass of baseball (m)=0.145 kilograms
Radius of baseball (r)=36.4 mm
Cross sectional area of baseball (A)=$\pi*(r^2)m^2$
Air Constant (Rd)=287 J/kg/K
Gravity (G)=9.8 m/s$^2$ As explained in more detail below, the current X component of distance a ball has traveled from its starting point (origin) of the trajectory can be determined by calculating, at each time step, the positional change in each component direction (x, y, and z) using the previous position and velocity component to determine the current component position and current component acceleration. The current acceleration component is then used to determine the current velocity component. These calculations are repeated for each subsequent time step until the ball either hits the ground or would have hit the ground.

To determine the current X component of distance a ball has traveled from the origin (initial position of the trajectory) based on the given weather parameters, Equation (6) is used:

$$X = x_o + \sum_{t=0}^{t(z)=0} \Delta x \quad (6)$$

where $x_0$ is the ball's initial X component at the starting point at time t=0 (where the ball is launched), $\Delta x = _{i-1}*\Delta t$ and u=x velocity, i=time step, and $\Delta t$=change in time ($t^i - t_{i-1}$) Likewise, v=y velocity and w=z velocity of the ball.

It will be understood that the subscript "i" refers to the ith timestep, where i starts at zero when the ball is hit and continues for as many timesteps until z=0, i.e., the ball is either on the ground or would have reached the ground at the same level as home plate, where:

$$u_i = i^{i-1} + \Delta u_i$$

$$\Delta u_i = ((x\mathrm{drag}_i + x\mathrm{lift}_i)/\mathrm{mass\ of\ baseball})*\Delta t$$

$$x\mathrm{drag}_i = -abs(ua_{i-1}*FFFa_{i-1})*\mathrm{sign}(ua_{i-1})*rho*A*Cd*0.5$$

$$y\mathrm{drag}_i = -abs(va_{i-1}*FFFa_{i-1})*\mathrm{sign}(va_{i-1})*rho*A*Cd*0.5$$

$$z\mathrm{drag}_i = -abs(wa_{i-1}*FFFa_{i-1})*\mathrm{sign}(wa_{i-1})*rho*A*Cd*0.5$$

where abs( ) is absolute value and $FFFa_i$ is the total 3 dimensional airspeed and
sign(variable)=1 for variable >0; −1 for variable <0; and 0 for variable=0.
rho=air density=$1.2929*(273/(T+273))*(P*e^{(-0.0001217*E1)}-0.3738*Rh*SVP/100)/760)$
$ua_i$=air speed velocity in x ($u_i$−$uair_i$)
$va_i$=air speed velocity in y ($v_i$−$vair_i$)
$wa_i$=air speed velocity in z ($w_i$−$wai_i$)
$uair_i$=x component of the wind velocity at a given point (can be measured or interpolated from the 3D wind vectors generated by the CFD model)
$vair_i$=y component of the wind velocity at a given point (can be measured or interpolated from the 3D wind vectors generated by the CFD model)
$wair_i$=z component of the wind velocity at a given point (can be measured or interpolated from the 3D wind vectors generated by the CFD model)
T=temperature in Celsius
P=air pressure in mm of Hg
El=elevation in meters
Rh=relative humidity
SVP=Saturation Vapor Pressure $$SVP = (0.61121 * e^{((18.678(T/234.5))*(T/(257.17+T))))} * 760/101.325$$

A=Cross Sectional Area of a baseball
Cd=Drag Coefficient=0.38

In this embodiment, the drag coefficient Cd is assumed to be constant. In other embodiments, the Cd may vary. The following Equations (7) and (8) are also used in the calculation:

$$x\mathrm{lift}_i = -(abs(va_i*FFFa_i)*\mathrm{sign}(vai) + abs(wa_i*FFFa_i)*\mathrm{sign}(wai))*rho*A*Cl*0.5 \quad (7)$$

$$y\mathrm{lift}_i = (abs(ua_i*FFFa_i)*\mathrm{sign}(uai) + abs(wa_i*FFFa_i)*\mathrm{sign}(wai))*rho*A*Cl*0.5 \quad (8)$$

where sign(var)=1 for var>0, −1 for var<0, and 0 for var=0, and where Cl (lift coefficient)=0.225. In this embodiment, the lift coefficient Cl is assumed to be constant. In other embodiments, the Cl may vary.

In the other two dimensions, Y (being oriented at a 90 degree angle from the forward direction of ball contact), and Z (being the up direction perpendicular to the ground), the equations for motion are almost identical to the equations for x, when each corresponding item is changed to reference the dimension being determined (for example, when looking at the z direction, each $u_i$ is replaced with a $w_i$). Acceleration in the z direction must be treated differently because the force of gravity must be accounted for using Equation (9):

$$\Delta w_i = (((w\text{drag}_i + w\text{lift}_i))/\text{mass of baseball}) - g)^* \Delta t \quad (9)$$

where g=9.81 m/s². The lift equation in the z direction is as follows in Equation (10):

$$z\text{lift}_i = (abs(uai*FFFai)*\text{sign}(uai) - abs(vai*FFFai)*\text{sign}(vai))*rho*A*Cl*0.5 \quad (10)$$

where sign(var)=1 for var>0, −1 for var<0, and 0 for var=0.

Figure 7:
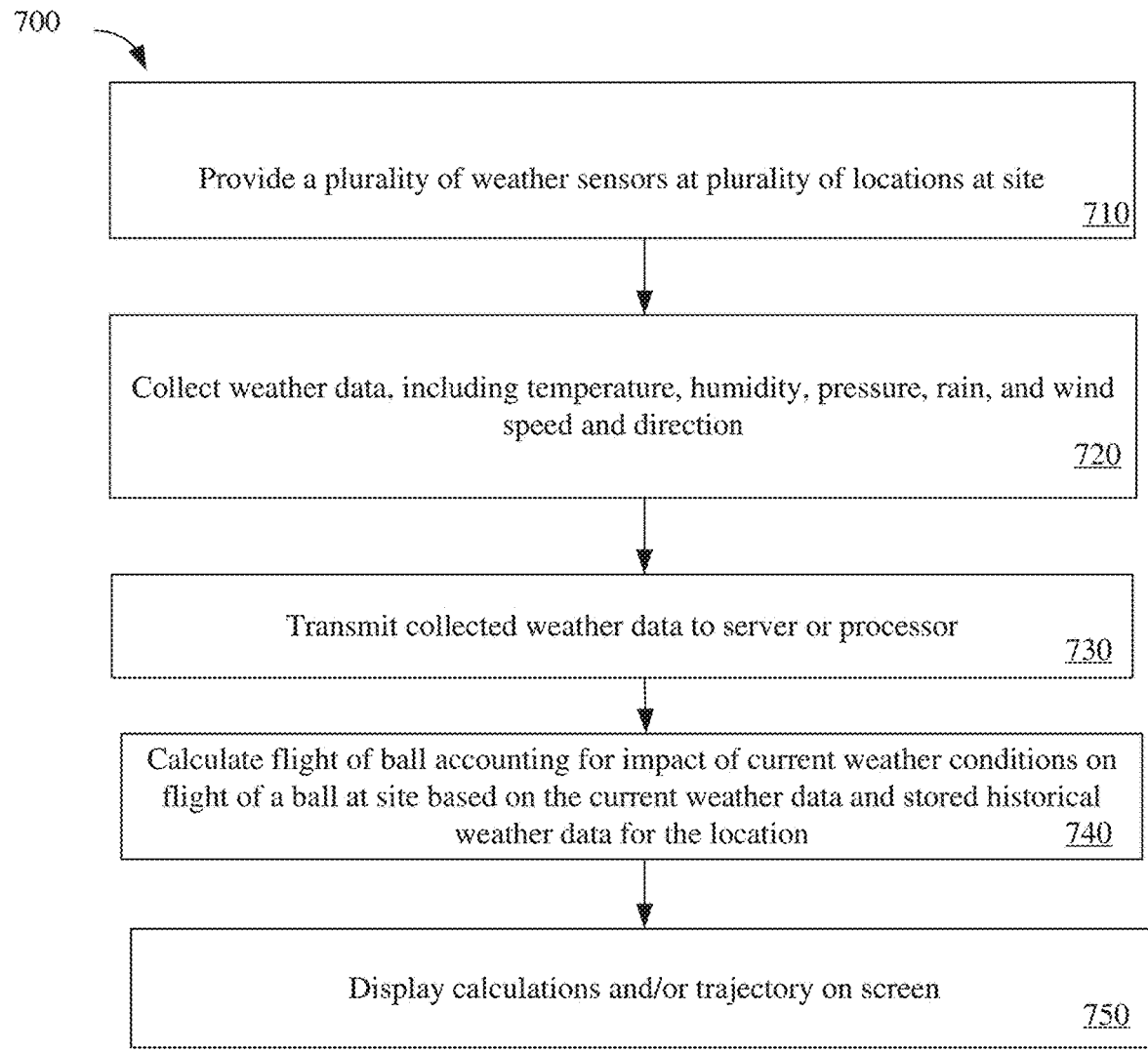
FIG. 7 is a flow chart of a method of predicting the of current weather conditions on the flight of a ball at a location in accordance with an embodiment.

FIG. 7 is a flow chart of a method 700 of predicting the impact of current weather conditions on the flight of a ball at a location. In Step 710, a plurality of weather sensors 110, are provided at different locations in the vicinity of an outdoor venue, such as a sports field or stadium, to collect weather data. These locations are preferably unobstructed. In Step 720, the weather sensors 110 (and LiDAR devices 120 and SODAR devices 130, if present) collect weather data, which can include temperature, humidity, pressure, precipitation, and wind speed and direction. The weather sensors 110 (and LiDAR devices 120 and SODAR devices 130, if applicable) then transmit the data to a server or processor 160 in Step 730. In some embodiments, the transmission of data to the server or processor 160 can be performed wirelessly. In certain embodiments, the weather data is first transmitted to a weather console 140, which, in turn, transmits the data to a data routing device 150, which then transmits the data to the server or processor 160. The method 700 further includes Step 740 in which the server or processor calculates the flight of a ball, accounting for the impact of current weather conditions on the flight of the ball at the site, based on the current collected weather data as well as stored historical weather data for the location. In Step 750, the calculated trajectory of the ball and calculated deviations based on weather can be displayed on a screen. Exemplary displays are shown in FIGS. 6A and 6B.

In accordance with an embodiment, the software on the server 160 performs several functions. The weather data are screened for accuracy by comparing the weather data collected from the weather stations 110 with each other. Any data that is determined to be out of bounds based on certain benchmarks is discarded. The data is then ingested into a model, which is based on the model described above, but is in a form that is conducive to quick calculations, where the model output is created in a fraction of a second using a combination of computer programming languages, including C, Python, and Perl. The model output gives the number of feet added to or taken away from the flight of the baseball by the current weather conditions in real-time. That information can be sent to and displayed on a website or screen, and can be updated frequently. According to an embodiment, the information is updated frequently (e.g., roughly every 2-20 seconds). The server or processor 160 can also archive the data and the calculations made.

In accordance with another embodiment, computational fluid dynamics (CFD) modeling is employed. A Computer Aided Design (CAD) model of the outdoor sports venue or stadium is created to use in the CFD modeling. According to this embodiment, wind is measured upstream of the stadium by wind sensors, such as anemometers, instead of positioning wind sensors in the stadium or outdoor sports venue. Other suitable wind sensors include LiDAR and SODAR devices. Alternatively, the upstream wind data may be obtained from commercial and/or public sources. In a particular embodiment, the wind sensors are positioned about ⅛-¼ mile upstream of the stadium such that wind measurements at about ⅛-¼ mile upstream of the outdoor sports venue can be used in the CFD model. At some stadiums (e.g., stadiums that have a consistent sea breeze), the wind consistently blows in a certain direction, and the wind sensors can be positioned upstream of the stadium in a particular direction. However, at other stadiums, the wind direction may not be so consistent, and wind sensors will need to be positioned in different directions in the vicinity around the stadium in order to be able to measure the wind upstream of the stadium on any given day. In other embodiments, the wind sensors can be positioned downstream of the stadium or in another convenient location in the vicinity of the stadium.

It will be understood that, in this embodiment, the wind sensors should be positioned far enough away upstream from the stadium and other structures (e.g., billboards) such that an increase in wind speed due to compression does not occur where the wind sensors are positioned. Thus, it will be understood that the distance of the wind sensors from the stadium is site specific. In most embodiments, the distance of the wind sensors from the stadium is likely to be in the range of about ⅛-½ mile.

The wind measurements by the wind sensors or wind data are used as inputs into a CFD model that produces 3D wind vectors at grid-points above the field across the entire stadium. These 3D wind vectors are used as inputs into the trajectory model described above. As described above, the trajectory model calculates the distance and direction that a given ball will travel under current weather conditions. Linear interpolation can be used to determine the wind at the actual point of the ball.

As described below, according to an embodiment, a CFD model can be used to provide the wind components in the stadium coordinate system even though the wind data are collected outside the stadium, where $x_s$ is zero at home plate and increases going toward the right field foul pole, $y_s$ is zero at home plate and increases going toward the left field foul pole and $z_s$ is just z, where z equals zero on the ground and increases vertically.

Using the data from the CFD model, the wind components are then linearly interpolated to each position of the ball at each time step on its trajectory. In order to calculate the trajectory of the ball, the wind components are resolved along (tangential) and perpendicular (normal) to the horizontal components of the original path of the ball. The vertical winds do not require any transformation. This is a two-step process.

First, the interpolated winds in the stadium coordinates are transformed into winds blowing from the standard west to east ($uair_g$) and south to north ($vair_g$) components. This could be referred to as compass or standard meteorological components. The equations for this transformation are as follows:

$$uair_g = uair_s*(\text{cosine}(\acute{A})) + vair_s*(\text{sine}(\acute{A})) \quad (11)$$

$$vair_g = vair_s*(\text{cosine}(\acute{A})) - uair_s*(\text{sine}(\acute{A})) \quad (12)$$

where $uair_s$ and $vair_s$ are the horizontal components of the wind in the $x_s$ and $y_s$ directions respectively, as defined above, and where $\acute{A}$=stadium orientation angle −225 degrees and where the stadium orientation angle=the compass heading from home plate to straight away center field +180 degrees.

Next, the compass or meteorological winds are converted into tangential and normal wind components to the horizontal components of the original path of the ball. This conversion is done using the following Equations (13) and (14):

$$dd=\arctan(-uair_g/-vair_g) \quad (13)$$

$$ff=((uair_g)^2+(vair_g)^2)^{0.5} \quad (14)$$

where dd=the compass heading from which the wind is blowing and
where ff=horizontal wind speed.

The tangential wind angle (tanwinang) and the normal wind angle (norwinang) are determined as follows, using Equations (15) and (16):

$$\text{tanwinang}=dd-\text{ballangzero} \quad (15)$$

$$\text{norwinang}=\text{tanwinang}+90 \text{ degrees} \quad (16)$$

where ballangzero=stadium orientation angle+ball angle, and ball angle=−45 degree to the left field foul pole, zero degrees to straight away center field, and 45 degrees down the right field foul line, and $$uair_i=ff_i*(\cosine(\text{tanwinang}_i))$$

$$vair_i=ff_i*(\cosine(\text{norwinang}_i))$$

One CFD model that is suitable for use in this embodiment is ANSYS CFD software available from ANSYS of Canonsburg, Pa. The calculations in the CFD model can be made in real-time. Other CFD models, such as OpenFOAM, SolidWorks, Star-CCM, COMSOL's CFD Module, Altair's AcuSolve, can also be used to generate 3D wind vectors. In some embodiments, LiDAR can be used to measure the wind within the stadium in order to verify the 3D wind vectors generated by the CFD model. Other wind sensors, including drones, SODAR devices, and anemometers can also be used to verify the 3D wind vectors generated by the CFD model. Thus, LiDAR will not be used in real-time in this particular embodiment, but rather LiDAR, at different grid-points, can be used to measure the actual winds in the stadium, to verify the CFD generated 3D vectors.

In accordance with another embodiment, a number of preassigned CFD test cases are used to feed the trajectory model described above. In this embodiment, several wind inputs are thoroughly calculated ahead of time, and then live measurements are fitted to these calculations. In this setup, CFD modeling is not performed live. Instead, pre-calculated lookup tables are used for the 3D vector grid points.

In addition to CFD and direct measurements, there are other ways which estimate (parameterize or approximate) the wind inside of an outdoor sports venue. These estimated approaches are less desirable for use in large stadiums or outdoor sports venues that have large, solid, or high obstructions to the wind entering the sports venue, because they provide less accuracy for such venues. That is, these type of obstructions typically result in very complex wind flow inside the sports venue. However, in less-obstructed, more wide-open sports venues, estimation (parameterization or approximation) can be used and still provide useful results for wind flow.

One such estimation method is the use of a log wind profile, where wind speed increases logarithmically with height. Thus, according to another embodiment, log wind profiling is used instead of CFD modeling.

Football

According to an embodiment, the trajectory of footballs can be modeled both in real time and in the future. This modeling is similar to the modeling for baseball as described above, but, for football, the output is applied to two directions for a 50-yard field goal kick from the 40-yard line (see FIG. 10) and a punt from the 25-yard line (see FIG. 11).

Figure 10:
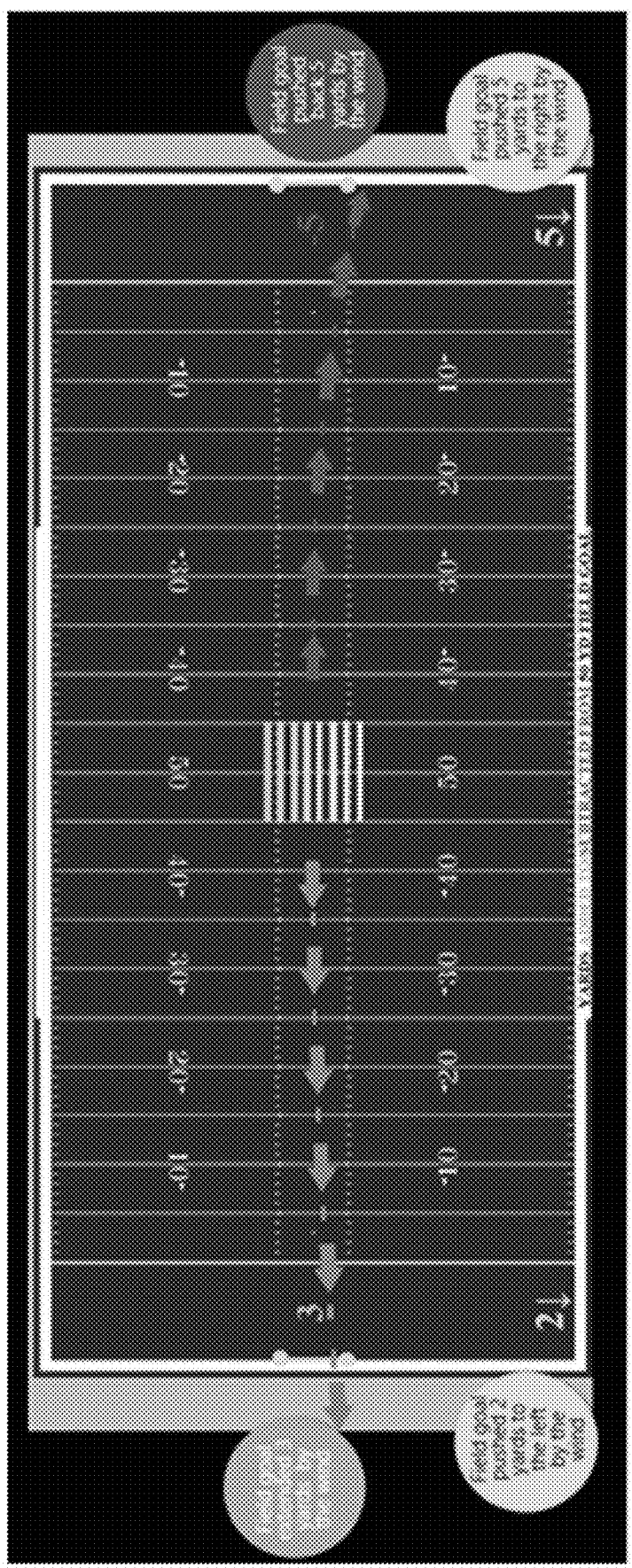
FIGS. 10-12 show examples of real-time wind impact on the trajectory of a football on at an outdoor football venue.

FIG. 10 shows an example of real-time wind impact on the flight of an average field goal that is kicked in football. In this example, as shown on the left side of FIG. 10, the trajectory of the kicked football is lengthened by 3 yards and pushed to the left 2 yards by the wind. As shown on the right side of FIG. 10, the trajectory is shortened 5 yards and pushed to the right 5 yards by the wind in this example.

Figure 11:
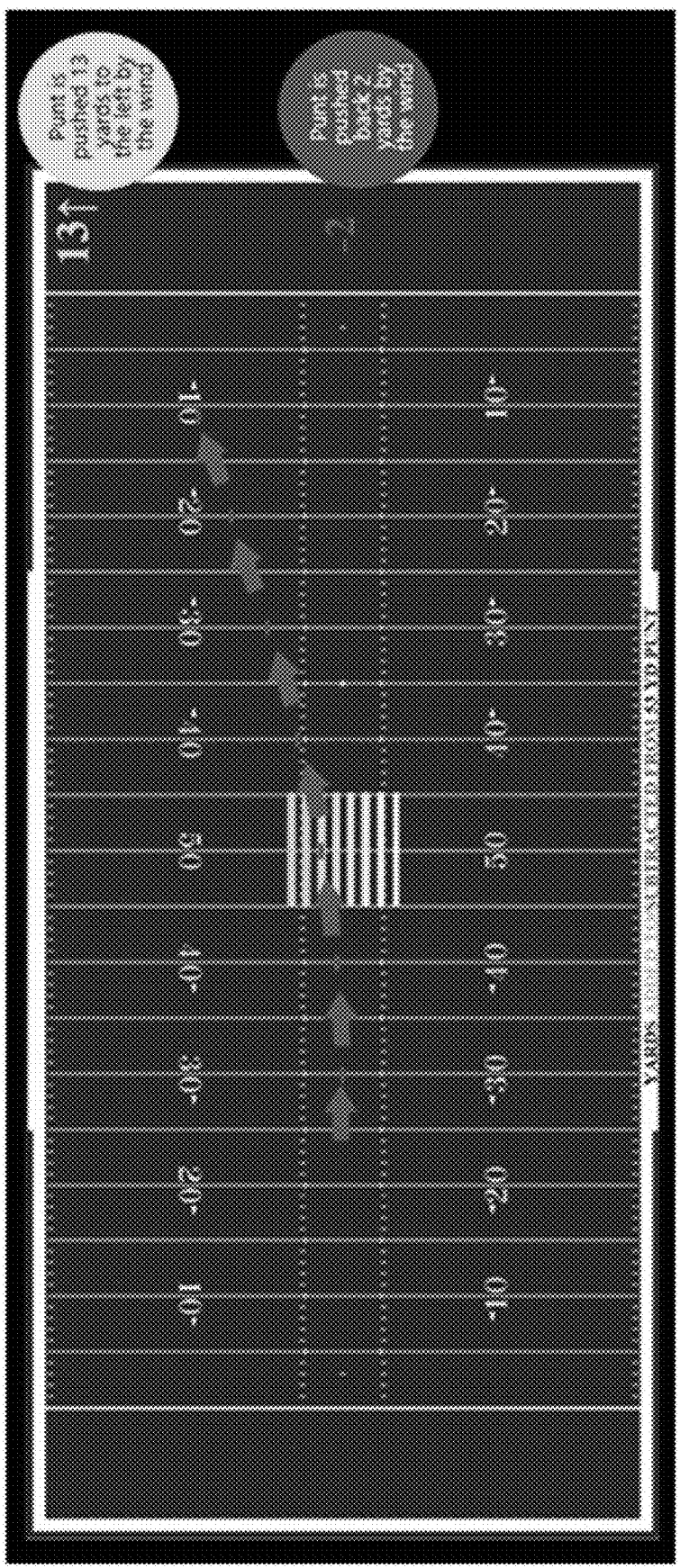

FIG. 11 shows an example of real-time wind impact on the flight of an average punt from the 25-yard line. The trajectory is shortened by 2 yards and pushed to the left 13 yards in this example.

According to an embodiment, specific field goals and punts can be entered by clicking the snap location and aiming point on a gridiron screen display. In an embodiment, specific meteorologic conditions of wind direction, wind speed, temperature, relative humidity, and pressure/elevation can be entered using screen slide bars on the screen display. Alternatively, the meteorologic conditions can be measured upstream of the outdoor football venue. As described above, the wind can be measured with sensors positioned upstream of the venue, including anemometers, LiDAR, RADAR, SODAR, etc. Preferably, such sensors are positioned no more than ⅛ mile upstream of the football venue. Alternatively, as noted above, other weather model data (e.g., public or commercial sources), can be used instead for estimated real time or forecast winds.

The resulting trajectories in both field directions are then calculated and those trajectories along with the length deviations and directional deflections in yards from average calm conditions are displayed similar to the examples shown in FIGS. 10 and 11.

Figure 12:
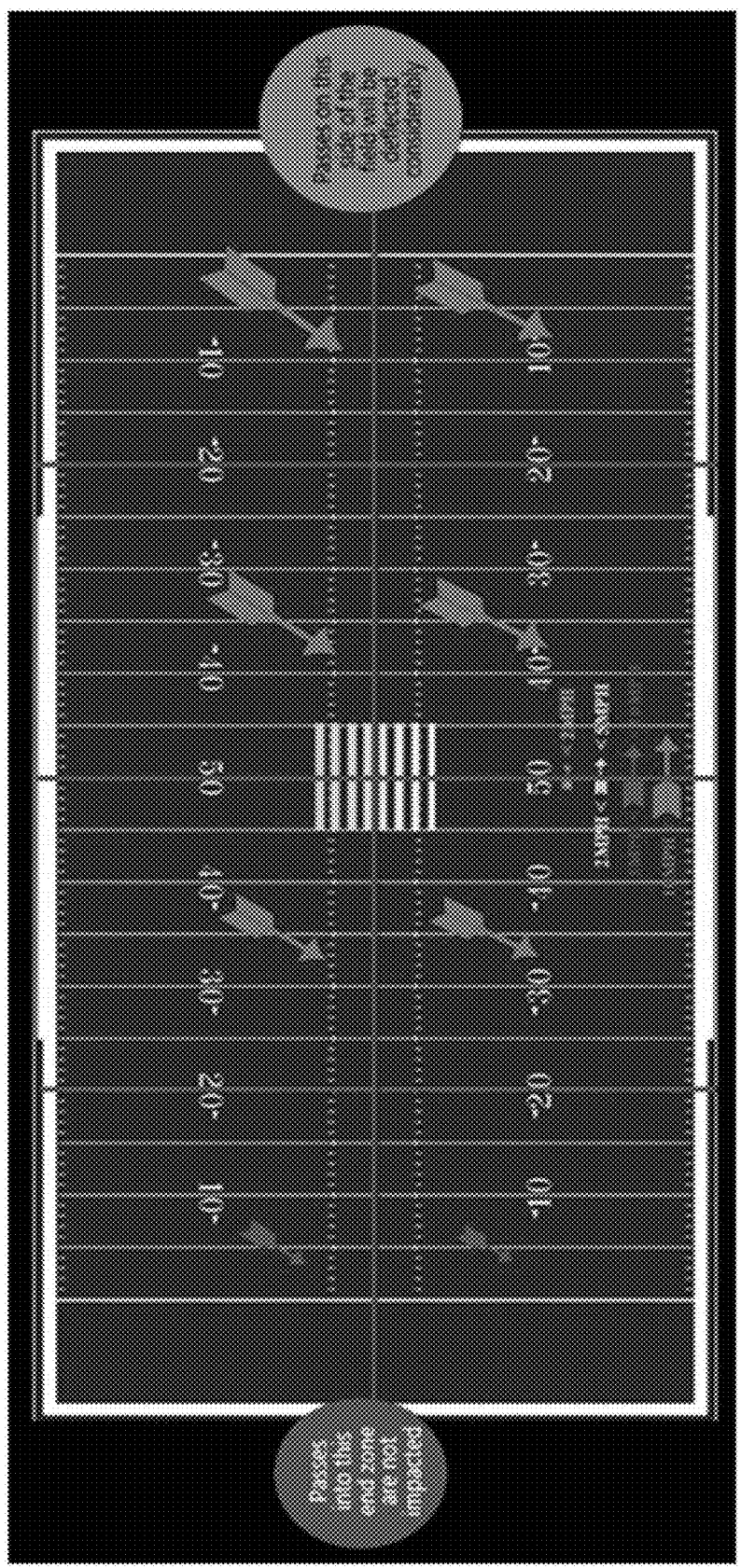

It will be noted that weather will also affect passes (throws) in addition to field goal kicks and punts. According to an embodiment, to determine the impact of weather on passes, the football field is separated into eight sections, as shown in FIG. 12. The impact of wind is determined for each of these eight sections. It will be understood that the football field can be separated into more or fewer sections in other embodiments. The screen display shown in FIG. 12 shows how the wind impacts throws or passes made in each of these sections representing particular areas of the field.

Figure 13:
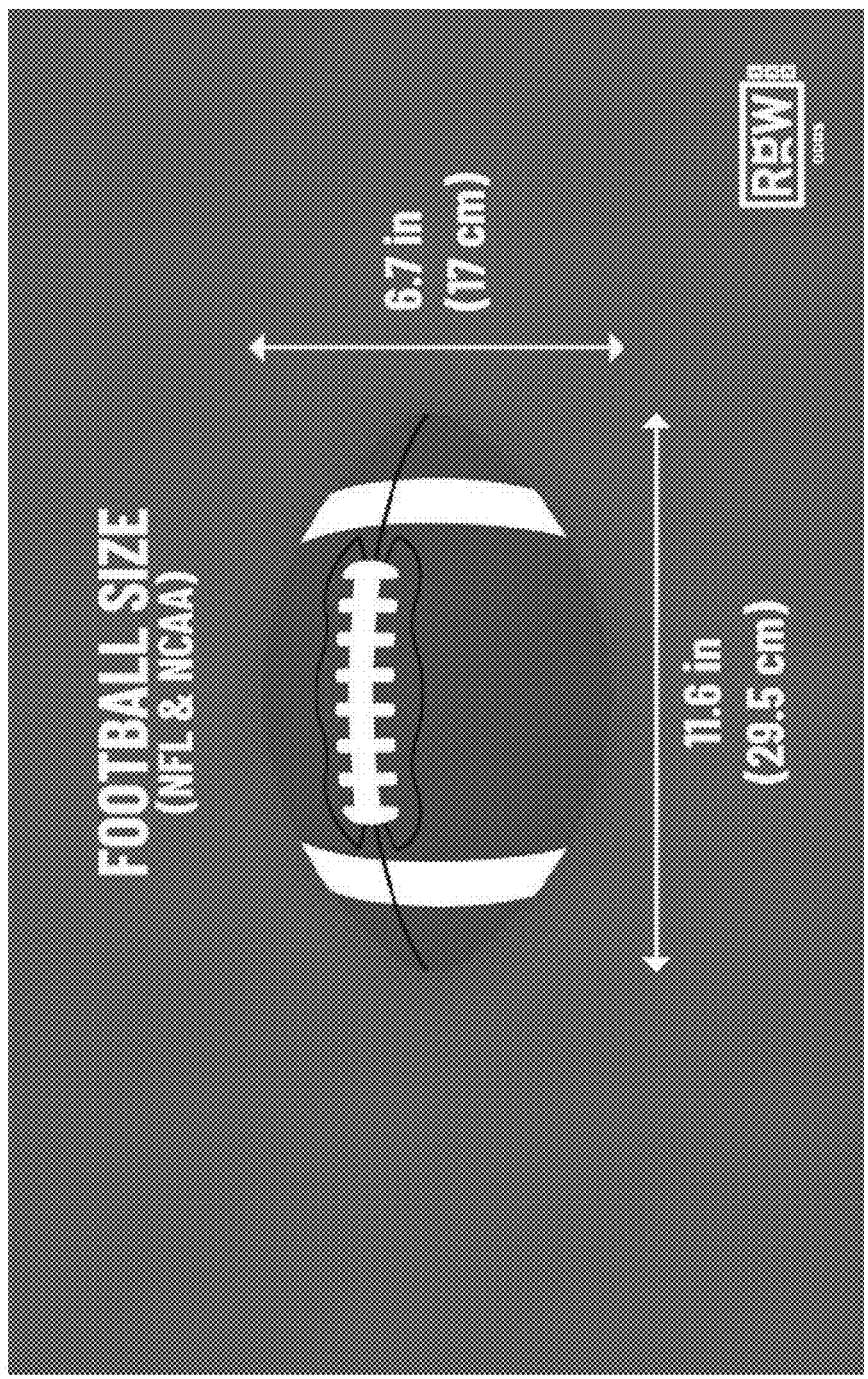
FIG. 13 shows an example of the prolate spheroid shape of a football.

There are other differences in football, which result in different modeling than that of baseball. For example, the shape of a football is significantly different than that of a baseball and it travels through the air differently depending on whether the football is thrown, punted, or kicked from the ground (kick off or field goal). A baseball is a sphere whereas a football is a prolate spheroid, which has a polar axis that is greater than its equatorial diameter. As shown in FIG. 13, a football is typically 11.6 inches long (along its polar axis) and has an equatorial diameter of 6.7 inches. A properly thrown pass will spiral, spinning about its polar axis. Therefore, different cross-sectional areas of the football are used for the different cases, based on the wind direction relative to the ball. This requires the use of different drag and lift calculations that vary with the wind direction and speed relative to the motion of the football.

The ball circumference that is used to compute the cross-sectional area used in the drag force calculation for motion in the Xt, Yt, and Zt directions is the X_effectiveballcircumference, Y_effectiveballcircumference, and Z_effectiveballcircumference, respectively. The effectiveballcircumference is different than the actual ball circumference used to generate a cross-sectional area because it takes into account the different amounts of turbulence created by footballs traveling through the air as passes vs. punts vs. kicks (field goals and extra points). As the football travels through the air, there are different cross-sectional areas in the direction of motion for Xt, Yt, and Zt. For a kick, the ball is spinning end over end in the Xt (forward) direction, where the average cross-sectional area is somewhere between the larger cross-sectional area of the football and the smaller one. If there were no air turbulence surrounding the kick, the effective ball circumference would simply be the average cross-sectional area of the smaller (short axis, whose diameter is the minor axis of the ball—a circle) and the larger (long axis, whose circumference is the larger elliptical area of the ball) cross-sectional area. But because of turbulence, the effective ball circumference needed to account for turbulence-induced drag is considerably larger for a kick compared to a tight spiraling pass. That is, a tight spiraling pass presents as a circle in the Xt direction, while a kick in its extreme presents as a circle and presents as an ellipse, but most of the time it is somewhere between the two extremes of the minor-axis circle and major-axis ellipse as it is spinning.

For a football that is kicked (from the ground as opposed to punted), the X_effectiveballcircumference of the ball used in the drag and lift equations is averaged around 2.525 times the effective circumference for passes, while for punts, it is averaged around 1.9285 times the effective circumference for passes. These ratios were determined empirically. It will be understood that punts are treated as wobbly passes (spirals) in that, for both passes and punts all the spin is gyro spin, which is spin in the plane perpendicular to the trajectory. The spin vector, which is defined as being perpendicular to the spin plane, is aligned with the trajectory. For kicks, which rotate end over end, all the spin is non-gyro, i.e., spinning in the plane of the trajectory.

For passes and punts (not kicks), the lift force is adjusted to account for the long axis of the ball tipping in flight so that it aligns with the angle defined by the tangent of the vertical and horizontal airspeeds (angle of attack), where angle of attack=arctan (vertical air speed of the ball/horizontal air speed of the ball). This changes over the flight of the ball. That is, an average pass or punt tilts up initially as it leaves the thrower's hand or the punter's foot, and then tilts down as it's nearing the end of its flight. For example, if a ball has any gyro spin (Yt-Zt plane spin) for horizontal flight, that spin is tilted into the Xt-Yt plane by the sine of the angle of attack. Conversely, the remaining gyro (Yt-Zt plane) spin is the original gyro spin multiplied by the cosine of the angle of attack.

Because footballs have a long and a short axis, where the length is roughly 11 inches and the width is roughly 7 inches, they present different cross-sectional areas, which are associated with different components of motion for kicks as well as for punts and passes. The drag force for these components of motion can be adjusted as set forth below.

For field goals and extra points, which are kicks, the cross-sectional area presented in the Xt direction is an average of the smaller and larger cross-sections as the ball spins end over end. The cross-sectional area in the Yt direction varies with spin angle. If the ball is spinning just in the Xt-Zt plane (vertical plane with 0 degree spin angle), then the larger cross-sectional area faces the Yt direction. If the ball is spinning entirely in the Xt-Yt plane (horizontal plane with 90 degree spin angle), then the cross section facing the Yt direction is the same as that facing the Xt direction, which is the average of the smaller and larger cross sections.

Conversely, for a ball spinning end over end in the Xt-Zt plane (horizontal with 0 degree spin angle) the cross-sectional area presented in the Zt direction is the same as the average of the smaller and larger cross-sections presented in the Xt direction. However, if the ball is spinning entirely in the Xt-Yt plane (horizontal plane with 90 degree spin angle), just the larger cross sectional area faces the Zt direction.

To account for this, the following equations are used to adjust the effective ball circumference used for cross-sectional area in the drag force calculation of field goals and extra points:

$$X\_effectiveballcircumference = \text{effective ball circumference} \quad (17)$$

$$Y\_effectiveballcircumference = (1 + abs(\cosine(\text{spin angle}))) * circfac * X\_effectiveballcircumference \quad (18)$$

$$Z\_effectiveballcircumference = (1 + abs(\sine(\text{spin angle}))) * circfac * X\_effectiveballcircumference \quad (19)$$

where circfac is the circumference factor that allows for appropriate changes in the effective cross-sectional area due to the orientation in the X, Y, Z direction due to axial tilt as explained above. In an embodiment, circfac −0.25 to account for the difference in cross-sectional areas between the average and the larger cross-sectional areas and the spin angle is the tilt of the end over end spinning football with 0 degrees of vertically spinning ball and 90 degrees for horizontally spinning ball, as explained in more detail below. It will be understood that the effective ball circumference is not the actual circumference of the football because, for a kick, the football is spinning end over end and has different circumferences all along the ball. The football therefore presents different circumferences along the trajectory depending on where it is in its spin. Thus, this variable is empirically determined so that reasonable trajectory values (distance, height, time in the air, etc.) are achieved for calm conditions.

Equation (17) is an expression of the effective ball circumference used to compute the cross-sectional area used in the drag force calculation for motion in the Xt direction. Equation (18) is the Y-component of the cross-sectional area used for the drag force calculation for motion in the Yt direction.

Consider first a field goal kick which is spinning vertically (0 spin angle—it's spinning entirely in the Xt–Zt plane with no tilt or spin, left or right) end over end as it moves in the Xt direction. It is alternately presenting the small circumferential cross-section (point of the ball aligned with Xt) and then the large circumferential cross-section (point of the ball aligned with the Zt direction up or down) in the Xt direction. Therefore, the cross-sectional area that affects the drag force in the Xt direction over a full end over end spin is some average of these two different cross-sectional areas. Thus, this X_effectiveballcircumference is used in the trajectory calculation of drag force in the Xt direction.

For this same vertically spinning field goal kick, the cross-sectional area presented in the Zt direction is a similar average over a full spin but, in this case, it is the smaller circumferential cross-section that is presented when the ball is pointing up or down (point aligned with Zt) and the larger circumferential area when the point of the ball is aligned with the Xt coordinate in the horizontal plane. Therefore, the cross-sectional area that affects the drag force in the Zt direction over a full end over end spin is some average of these two different cross-sectional areas. Thus, this Z_ballcircumference is used in the trajectory calculation of drag force in the Zt direction.

For this same vertically spinning field goal kick, the cross-sectional area presented in the Yt direction is always the larger circumferential area since this vertically spinning (0 spin angle) ball is rotating just in the Xt–Zt plane, which is perpendicular to the Yt coordinate. Therefore, the cross-sectional area that affects the drag force in the Yt direction over a full end over end spin is just the larger circumferential cross-sectional area associated with the long axis of the ball. Thus, this Y_effectiveballcircumference is used in the trajectory calculation of drag force in the Yt direction.

Now consider how these cross-sectional areas change as this end over end spinning field goal kick has non-zero spin angle such that it is no longer spinning vertically. If the spin angle is 90 degrees, then the football is spinning on its side in the horizontal (Xt–Yt) plane with the smaller and larger circumferential cross-sections now being presented in the Xt and Yt directions over a full spin. In this case, the Zt coordinate is always perpendicular to the plane of spin so the larger circumferential cross-sectional area will face the Zt direction throughout the spin.

The Y and Z_effectiveballcircumferences must account for the spin angle in the calculation of Yt, and Zt components of the drag force in Equations (18) and (19). For a field goal, the Xt component of the drag force is independent of the spin angle because the ball is always spinning in a plane aligned with (containing) the Xt coordinate. Therefore, the X_effectiveballcircumference is the empirically determined value of circumference used in the drag force equations such that a ball in calm air has distance, height, and time in air values that match observed values.

For punts and passes, the angle of attack determines the cross-sectional area presented in the Xt and Zt directions. In the Yt direction, the cross-sectional area presented is the larger cross section of a football, i.e., looking at the ball from the side, the big side of the ball.

A 0 degree angle of attack is moving horizontally while a 90 degree angle of attack is moving vertically.

For a ball moving horizontally, the cross-sectional area presented in the Xt direction is the smaller cross section while the larger cross-sectional area is presented in the Zt direction. Conversely, for a ball moving vertically, the cross-sectional area presented in the Xt direction is the larger cross-sectional area while the small cross-sectional area is presented in the Zt direction.

To account for this, the following equations are used to adjust the effective ball circumference used for cross-sectional area in the drag force calculation of punts and passes:

$$Y\_effectiveballcircumference=(1+circfac)*effective\ ball\ circumference \quad (20)$$

$$X\_effectiveballcircumference=(1-(cosine(2*angle\ of\ attack)*circfac)*Y\_effectiveballcircumference \quad (21)$$

$$Z\_effectiveballcircumference=(1+(cosine(2*angle\ of\ attack)*circfac)*Y\_effectiveballcircumference \quad (22)$$

Additionally, in an embodiment, since footballs are inflated with air, adjustments can be made for ball inflation based on air temperature and barometric pressure. For example, the launch speed of the football is reduced for colder temperatures (<about 65° F.) by launch speed=given launch speed+coefficient*(Tf−65) where Tf is the current temperature and coefficient is 0.104 mph/deg. Such adjustments based on air temperature and barometric pressure may be used in the absence of any actual trajectory data (e.g., Next Gen Stats real time data provided by the National Football League (NFL)).

In football, when a ball is kicked, there is an intended target, which is inferred from the initial direction of the ball. However, what is in the kicker's mind is unknown; it is unknown where the kicker is aiming or whether the kicker might be adjusting to accommodate for the wind or a tendency to slice or hook the ball. Thus, calculations are based on the initial path and direction of the ball as it is kicked. For example, when a field goal kicker attempts a field goal under ideal conditions, his intention is for the ball to pass through the very middle of the goal posts—with equal distance between the left and right post. However, there are three primary factors that can influence this intention.

The first factor is aim, which is the initial bearing of the ball as it comes off the kicker's foot, before any weather or spin angle effects (slice or hook) significantly impact the ball. The kicker may misjudge his aim (left or right), so the ball could end up left or right of the exact middle of the goal posts.

The second factor is spin. If the ball is tilted (left or right) when it is kicked, this will create horizontal spin, which will cause the trajectory of the ball to curve during its flight.

The third factor is wind, which can blow the ball left or right (forwards or backwards) during its flight. This happens both by the actual flow of the wind and the interaction of the wind with the spin of the ball.

In football, the influence of aim, spin, and wind on each attempted field goal (or extra point) is quantified to resolve for a field goal attempt in order to account for what might have caused the football to go where it went as it crossed the end line. It will be understood that the end line is the line that runs across the entire back of the endzone, directly above which sits the horizontal cross bar of the goal post. As described in more detail below, the influence of aim, spin, and wind can be quantified to account for whether the kicker actually aimed the ball in a certain direction and or whether the actual trajectory of the ball curved due to spin or wind. This same approach can be applied to a football that is punted or thrown.

Aim, Spin, and Wind Component Determination for Field Goals and Extra Points

The influence of aim, spin, and wind can be quantified as described in more detail below. The influence of aim, spin, and wind can be extracted from the calm and wind affected ball trajectories in no particular order. The only thing that is required first is the trajectories—both calm and wind affected. According to an embodiment, to quantify the aim, the calm conditions trajectory is used to simplify the calculation. That is, in the calm conditions case, only aim and spin can move the ball left or right of the intended target. In the discussion below, the x-axis is parallel to the sidelines and the y-axis is parallel to the end line. The x,y origin is at the left end of the home sideline where it intersects with the end line.

According to this embodiment, a calculation is made of the amount of displacement left or right of the ball from its original path by its spin at the point where it crossed the plane of the end line. For calm conditions, this is the ball's Yt coordinate at the end line. Yt is projected onto the end line and this projection is referred to as the sideways displacement (SD).

The displacement of the ball from the very middle of the goal posts is also determined. The exact middle of the goal posts is used as the reference point because it is presumably the aiming point under ideal conditions. The position of the ball is measured as it crosses the plane of the end line and the difference between that point and the point at the very middle of the goal posts is subtracted. This is called y miss (YM), since the end line is parallel to the y-axis.

The displacement due to aim is then determined by subtracting out the sideways displacement (SD) from y miss (YM), using the equation: Displacement due to Aim=YM−SD. It will be understood that SD is the sideways displacement due to spin projected onto the endline, whereas YM is the total displacement of the ball's position at the endline from the center of the endline. If the football is aimed at the center of the endline, there is no difference in the case of calm weather conditions (no wind). However, the football is not always aimed at the center of the endline. YM is the sum of the ball displacements at the endline due to aim, spin, and wind. For example, in calm conditions, if the football is aimed at the left upright, and it does not slice or hook at all, then SD=0 and YM=−3 yards (3 yards to the left of the center) and the ball will hit the left upright at the endline.

The impact of the wind on the ball's left/right deviation or wind deviation (WD) is determined using the three-dimensional wind field, which is determined using computational fluid dynamics (CFD), as described above. The WD is the difference between the y-coordinate at the end line of the actual ball and the y-coordinate at the end line of the calm ball (ball kicked under calm conditions with no wind impact).

The impact of aim and wind on the ball is then subtracted from the YM of the actual ball. Mathematically, the deviation due to spin=YM−WD−Aim, where this YM (y miss) is for the actual ball—not the calm conditions.

It will be understood that to make the calculations the above, the actual trajectory of the football needs to be determined as well as what that same football's trajectory would have been under calm conditions. The data required for these trajectory calculations include: (1) the three-dimensional wind field over the flight of the football using CFD (as discussed above), (2) the exit velocity of the football (which can be provided by a source, such as Next Gen Stats), (3) the horizontal launch angle of the football (the horizontal direction the ball initially moves with respect to the sideline), (4) the vertical launch angle of the football (as determined as described below), (5) the spin rate of the football (an average value from observation of many examples), (6) the spin axis of the football (determined iteratively, as described below), and (7) the specific position (launch coordinates) of the football on the field (which can be provided by a source, such as Next Gen Stats). For punts, the specific horizontal landing coordinates of the football or where the football goes out of bounds is also needed. For field goals, necessary data also include some horizontal coordinates along the path of the football, including where the football crosses the endline.

With all of the data listed above, the actual trajectory of the football can be calculated, as discussed above. In the event all of the above data are not available, further steps need to be taken to create these trajectories, as set forth in detail below.

Typically for field goal kicks, only the horizontal coordinates of the path of the ball, including launch coordinates and its horizontal position where it crosses the end line, are known but not where the ball lands. Sometimes the exit velocity is provided, but is frequently incorrect. Thus, according to an embodiment, to determine the impact of the aim, spin, and wind on the trajectory of the football, the assumptions below are made.

First, if the given exit velocity is sufficient for the ball to cross the end line at a reasonable height, then it is used in the calculation. It will be understood that a sufficient exit velocity is the velocity that a football kicked in calm conditions (no wind) needs to reach the endline at a height that is at least the crossbar height when the football is kicked from the launch position. Sufficient exit velocity is determined by calculating the velocity a calm ball requires to reach the endline at the crossbar height when kicked from the launch position.

If the given exit velocity is not sufficient, this velocity is adjusted upward or downward to match the observed height of the ball at the endline. In the infrequent case where the field goal is missed short, then the given velocity is used. For simplicity, a vertical launch angle of 35 degrees is assumed because this is roughly an average of what has been observed and gives the maximum distance a field goal kick can travel, assuming it clears the defenders. It is assumed that the ball is oriented straight up and down as it is kicked, which would produce zero slice or hook. Thus, the spin axis (SA)=0.

Figure 14:
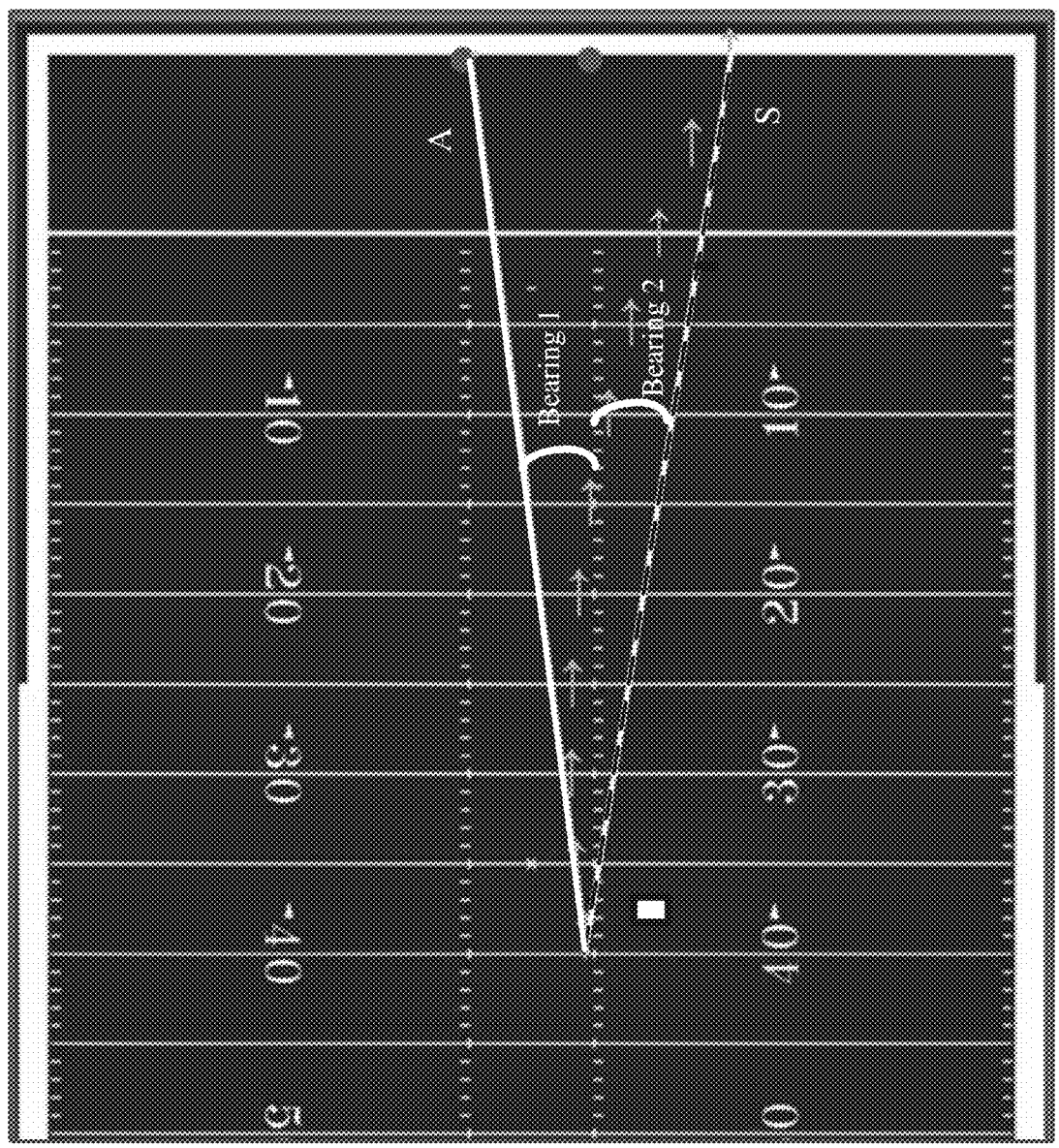
FIG. 14 shows an example of the trajectory of a kicked football and the lines used to represent the effect of aim and spin on the football.

Second, in order to estimate the aim of the ball, the original direction of the ball is estimated by using the first few x and y coordinates that are provided—typically the first 5 to 10 yards along its path (defined by the arrows in FIG. 14). As shown in the example shown in FIG. 14, the straight solid line A, which is created by the first few x and y coordinates starting from the 40 yard line, represents the aim. The angle that this line A makes with the sideline is referred to as angle Bearing1.

Third, in order to get an estimate of the impact of the spin axis and the wind on the trajectory of the ball, a second angle Bearing2 is used. As shown in FIG. 14, the dashed line S is the line from where the ball is kicked to where the ball crosses the end line. Bearing2 is the angle between this dashed line S and the sideline. This is the change of the left/right movement divided by the downfield movement. It is the horizontal angle defined by a line that extends from where the ball was kicked to where it crosses the plane of the end line. Thus, Bearing2=Arctan [dy/dx].

To match what actually happened in the trajectory of the ball, a corrective iteration scheme is used to minimize the errors in the calculated Bearing1 and Bearing2 angles to match the actual Bearing1 and Bearing2 angles. This is done by using the first estimate of Bearing1 and Bearing2 and determining the error in each from their measured values. Horizontal angle and spin axis are then adjusted respectively by subtracting these errors. This process is repeated until the error is no more than about one percent (1%).

Figure 15:
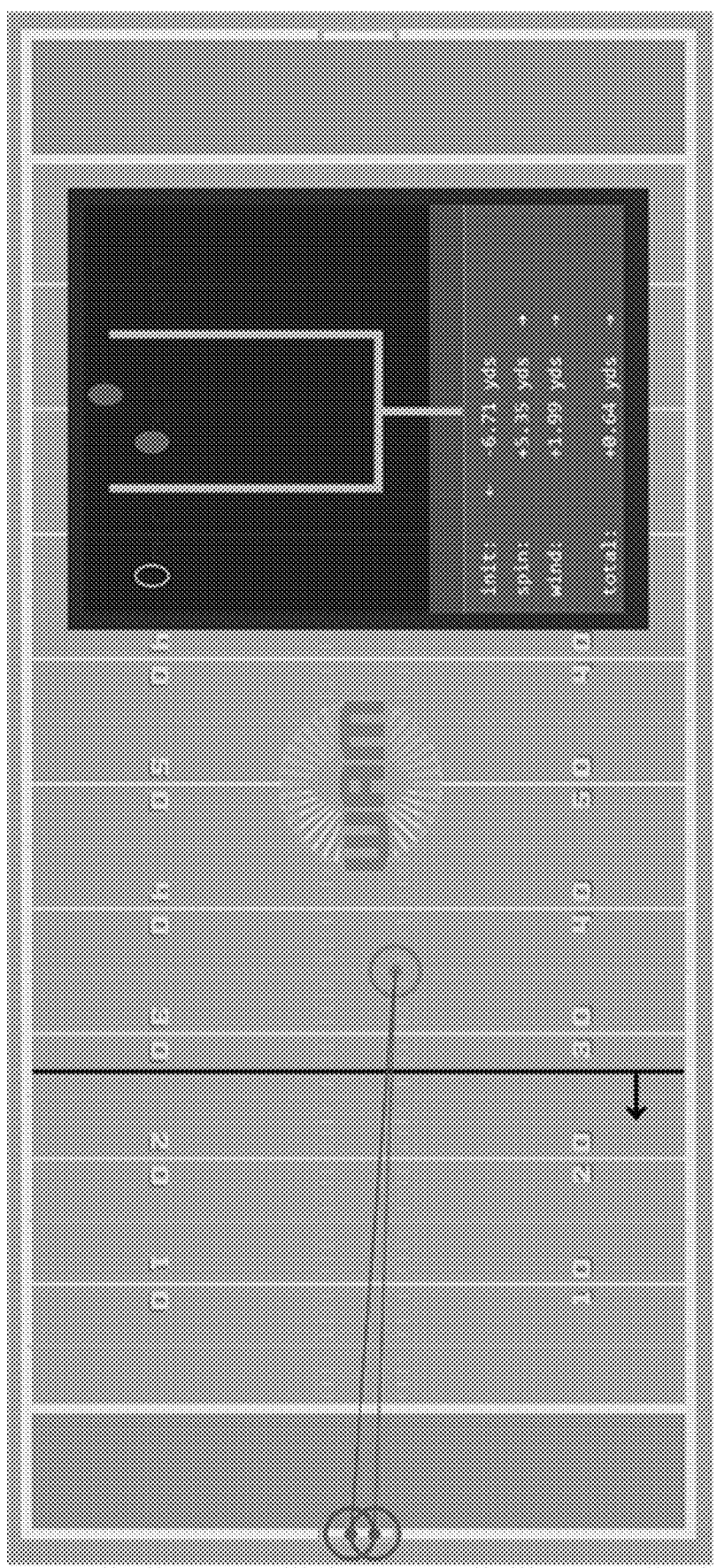
FIG. 15 shows an example of an output displayed on a screen that quantifies the aim, spin, and wind for a given field goal attempt.

If the iteration scheme fails to reduce the error below some arbitrary value, then the trajectory iteration with the smallest error is chosen. FIG. 15 shows an example of an output displayed on a screen that quantifies the aim, spin, and wind for a given field goal attempt. It will be noted that this iteration process can be applied to not just football kicks, but also to trajectories of golf balls, baseballs, etc., to improve their accuracies.

Just like with field goals, typically limited data are available for punts. Generally, the only data available include exit velocity, launch and landing coordinates. Therefore, it is assumed that spin on punts is similar to spin on passes. This is often referred to as gyro spin, where the spin axis aligns with the trajectory, so it has minimal impact on the ball's movement left or right.

If the given exit velocity is sufficient for the ball to reach the given landing point, then it is used. If not, this speed is adjusted upward or downward. An initial estimate of vertical launch angle of 55 degrees is used because this is roughly an average of what has been observed. This gives the combination of maximum hang time with sufficient distance for what is considered a successful punt. Since it is known where the ball lands (or goes out of bounds), a similar scheme for bearing as with field goal is used, where we replace the location of where the ball crosses the end line with the actual location of where it landed. In this case, bearing is just used to adjust horizontal angle. Bearing is the change in the left/right movement divided by the downfield movement. It is the horizontal angle defined by a line that extends from where the ball was kicked to where it landed. Thus, $$\text{Bearing} = \text{Arctan}\left[\frac{dy}{dx}\right].$$

An iteration scheme similar to that used for field goals is used to correct the exit velocity and launch angle to minimize the distance error between the actual distance of the ball and our calculated trajectory distance of the ball. Similarly, the horizontal angle is iteratively corrected to minimize the bearing error.

Figure 16:
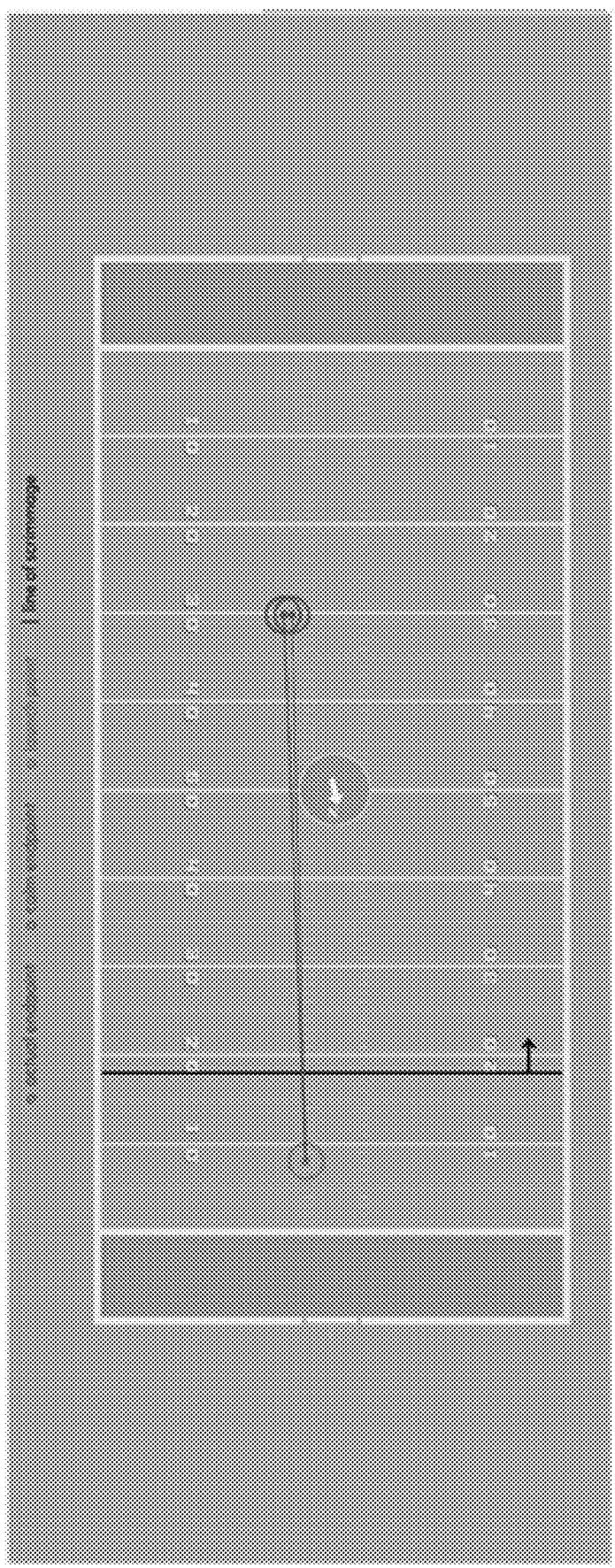
FIG. 16 shows an example of an output displayed on a screen that quantifies the wind impact for a given punt.
Figure 17:
FIGS. 17-20 show additional examples of real-time wind impact on the trajectory applied to a football stadium and a punted football.
Figure 18:
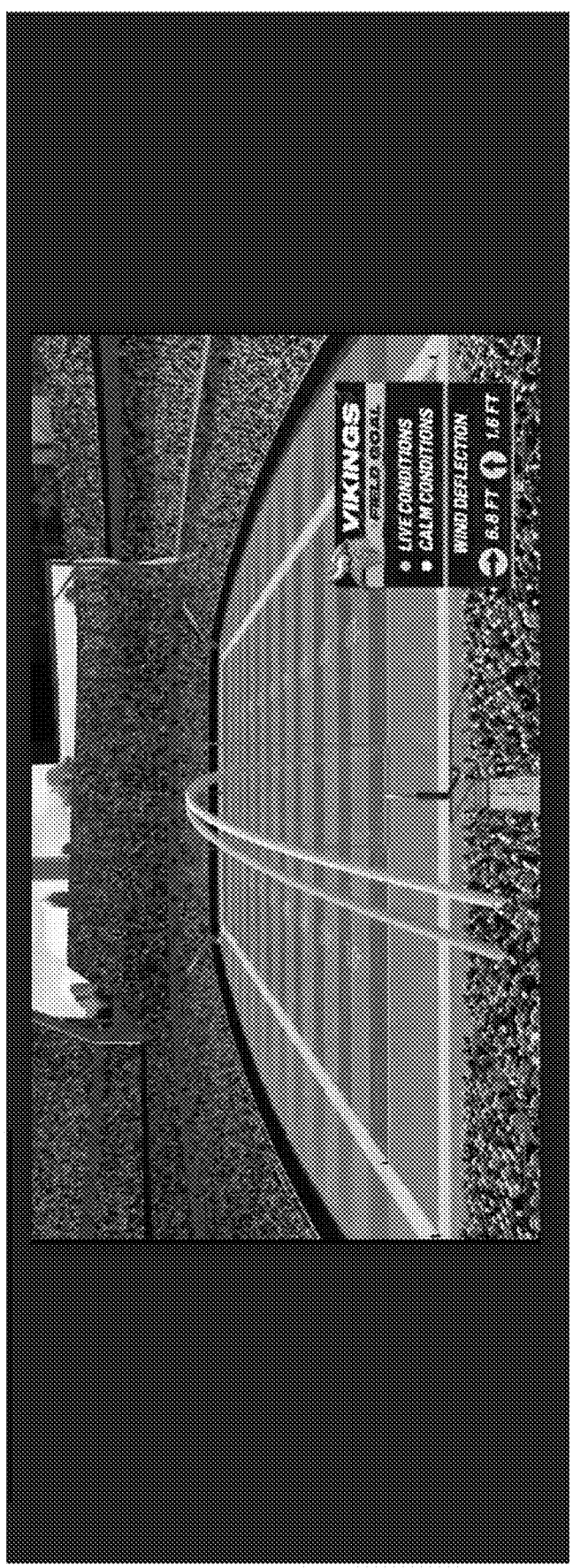
Figure 19:
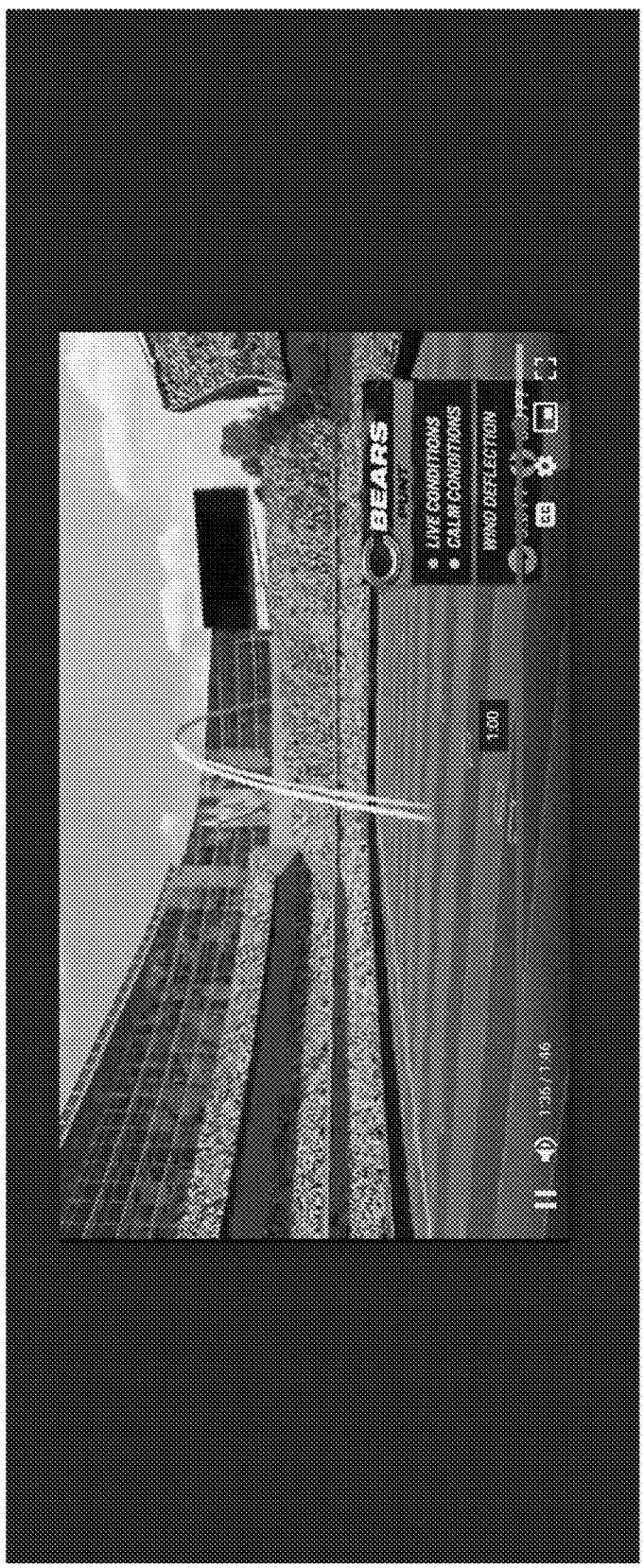
Figure 20:

If the iteration scheme fails to reduce the error such that it is no more than about one percent (1%), then the trajectory iteration with the smallest error is chosen. FIG. 16 shows an example of an output displayed on a screen that quantifies the wind impact for a given punt.

FIGS. 17-20 are exemplary illustrations of the above-described embodiments applied to a football stadium and a football.

Although only a few embodiments have been described in detail, it should be appreciated that the invention may be implemented in many other forms without departing from the scope of the invention. In view of all of the foregoing, it should be apparent that the present embodiments are illustrative and not restrictive and the invention is not limited to the details given herein, but may be modified within the scope and equivalents of the appended claims.

What is claimed is:

1. A computer-implemented method of determining an impact of weather parameters on a flight of a football at an outdoor football venue, the method comprising:
   providing a digital model of the outdoor football venue to a processor;
   at the processor, obtaining real-time data for at least one weather parameter at or near the outdoor football venue, wherein the at least one weather parameter is wind and the real-time data is obtained from at least one weather sensor positioned upstream of the outdoor football venue;
   at the processor, inputting the real-time data for the at least one weather parameter into a computational fluid dynamics (CFD) model;
   at the processor, using the CFD model with the inputted real-time data and the digital model of the outdoor football venue to produce three-dimensional wind vectors at grid-points in the digital model of the outdoor football venue;
   at the processor, using the three-dimensional wind vectors to calculate in real-time a trajectory of the football at the outdoor football venue based on the real-time data obtained for the at least one weather parameter, the calculated trajectory of the football accounting for the impact of the at least one weather parameter, wherein the trajectory of the football is calculated using a selected cross-sectional area of the football, the cross-sectional area of the football selected based on whether the football is thrown, punted, or kicked; and
   displaying on a screen at least one of the calculated trajectory of the football and a calculation of the impact of the at least one weather parameter on the calculated trajectory of the football.

2. The computer-implemented method of claim 1, wherein for determining the trajectory of a football that is thrown, the digital model of the outdoor football venue is divided into a plurality of substantially equally sized sections, wherein each section represents a particular area of the outdoor football venue.

3. The computer-implemented method of claim 2, further comprising determining the impact of a weather parameter in each of the sections.

4. The computer-implemented method of claim 2, wherein the plurality of substantially equally sized section comprises eight sections.

5. The computer-implemented method of claim 1, wherein a circumference of the football is used to calculate the selected cross-sectional area.

6. The computer-implemented method of claim 5, wherein for a football that is kicked, the circumference of the football used to calculate the selected cross-sectional area averages about 2.5 times a circumference used for a thrown football.

7. The computer-implemented method of claim 5, wherein for a football that is punted, the circumference of the football used to calculate the selected cross-sectional area averages about twice a circumference used for a thrown football.

8. The computer-implemented method of claim 1, further comprising adjusting the calculated trajectory based on current air temperature and barometric pressure.

9. The computer-implemented method of claim 1, wherein the at least one weather parameter further comprises humidity, barometric pressure, and temperature.

10. The computer-implemented method of claim 1, wherein the digital model is a computer aided design (CAD) model.

11. The computer-implemented method of claim 1, wherein obtaining data for at least one weather parameter is performed in real time.

12. The computer-implemented method of claim 1, further comprising determining an impact of aim or spin on the calculated trajectory.

13. The computer-implemented method of claim 12, further comprising displaying on a screen the impact of aim or spin on the calculated trajectory.

14. A system comprising:
   a data storage that contains wind model data for an outdoor football venue;
   at least one processor, wherein at least one processor contains a digital model of the outdoor football venue; and
   a machine-readable medium including instructions stored therein, which when executed by the at least one processor, causes the at least one processor to perform operations in real-time comprising:
      at the at least one processor, obtaining current weather data comprising wind data; and at the at least one processor, calculating a trajectory of a football at the outdoor football venue, using the wind model data and the current weather data, taking into account impact of current weather conditions on movement of the football at the outdoor football venue based on the obtained current weather data for current weather parameters, wherein calculating the trajectory comprises using a computational fluid dynamics model that generates three-dimensional wind vectors at the outdoor football venue, wherein the trajectory of the football is calculated using a selected cross-sectional area of the football, the cross-sectional area of the football selected based on whether the football is thrown, punted, or kicked;

at least one wind sensor positioned upstream of the outdoor football venue, wherein obtaining current weather data further comprises receiving weather data from the at least one wind sensor; and a display for outputting in real time the calculated trajectory of the football or calculations based on the calculated trajectory of the football.

15. The system of claim 14, wherein the at least one wind sensor comprises at least one of a LiDAR device, a SODAR device, and an anemometer.

16. The system of claim 14, further comprising at least one temperature sensor and at least one of a humidity sensor and a barometric pressure sensor.

17. The system of claim 14, further comprising a wind sensor positioned upstream of the outdoor football venue.

18. The system of claim 14, wherein the system further comprises a data storage containing historical wind data for a location at or near an outdoor football venue, wherein determining an impact of current weather conditions on movement of the football at the outdoor football venue comprises determining a contribution of current wind based on one of actual measured wind speed and a historical average wind speed.

19. A computer-implemented method of determining an impact of parameters on a flight of a football at a football venue in real time, the method comprising:

obtaining real-time data from at least one weather sensor positioned upstream of the football venue;

at a processor, calculating in real time a flight of the football based on at least one of the parameters, wherein the parameters comprise an aim of a kicker and a spin of the football in flight, and wherein the flight of the football is calculated using a selected cross-sectional area of the football, the cross-sectional area of the football selected based on whether the football is thrown, punted, or kicked; and displaying on a screen at least one of the flight of the ball calculated by the processor and a deviation on the flight caused by at least one of the parameters.

* * * * *